US012073985B2

(12) United States Patent
Hayashi

(10) Patent No.: US 12,073,985 B2
(45) Date of Patent: Aug. 27, 2024

(54) COIL STRUCTURE, LEAD FRAME, AND INDUCTOR

(71) Applicant: SHINKO ELECTRIC INDUSTRIES CO., LTD., Nagano (JP)

(72) Inventor: Shintaro Hayashi, Nagano (JP)

(73) Assignee: SHINKO ELECTRIC INDUSTRIES CO., LTD., Nagano (JP)

( * ) Notice: Subject to any disclaimer, the term of this patent is extended or adjusted under 35 U.S.C. 154(b) by 793 days.

(21) Appl. No.: 17/241,444

(22) Filed: Apr. 27, 2021

(65) Prior Publication Data

US 2021/0350978 A1 Nov. 11, 2021

(30) Foreign Application Priority Data

May 8, 2020 (JP) ................................ 2020-082413

(51) Int. Cl.

| | |
|---|---|
| ***H01F 27/29*** | (2006.01) |
| ***H01F 27/25*** | (2006.01) |
| ***H01F 27/255*** | (2006.01) |
| ***H01F 27/32*** | (2006.01) |
| ***H01F 41/04*** | (2006.01) |

(52) U.S. Cl.

CPC ........... *H01F 27/29* (2013.01); *H01F 27/255* (2013.01); *H01F 27/323* (2013.01); *H01F 41/04* (2013.01)

(58) Field of Classification Search

CPC ........................... H01F 27/263; H01F 27/2823

See application file for complete search history.

(56) References Cited

U.S. PATENT DOCUMENTS

2010/0033288 A1* 2/2010 Yokoyama .......... H01F 41/0246 336/200
2020/0051728 A1 2/2020 Matsumoto et al.
2020/0128675 A1* 4/2020 Matsumoto .......... H05K 3/4658
2021/0343471 A1* 11/2021 Wang .................... H01F 27/292

FOREIGN PATENT DOCUMENTS

JP 2005142284 A * 6/2005
JP 2009-135320 6/2009
JP 2009135320 A * 6/2009
JP 2020-027820 2/2020
JP 2020-065007 4/2020

OTHER PUBLICATIONS

Office Action mailed on Jan. 9, 2024 issued with respect to the basic Japanese patent application No. 2020-082413.
Office Action mailed on Sep. 5, 2023 with respect to the corresponding Japanese patent application No. 2020-082413.

* cited by examiner

*Primary Examiner* — Malcolm Barnes
(74) *Attorney, Agent, or Firm* — IPUSA, PLLC

(57) ABSTRACT

A coil structure includes metal plates each including a spiral conductor, and a row of terminals, aligned in a predetermined direction on an outer side of the conductor, and formed by plate portions thicker than the conductor. Two ends of the conductor are connected to two adjacent plate portions for each metal plate. The row of terminals of a first metal plate is bonded to the row of terminals of a second, adjacent metal plate. The position where the two ends of the conductor connect to the two adjacent plate portions shifts one place toward the second end for each upward increase in level within a laminate along a laminated direction of the metal plates, so that the conductors of each of the metal plates are connected in series to form a spiral coil.

14 Claims, 20 Drawing Sheets

COIL STRUCTURE, LEAD FRAME, AND INDUCTOR

CROSS-REFERENCE TO RELATED APPLICATIONS

This application is based upon and claims priority to Japanese Patent Application No. 2020-082413, filed on May 8, 2020, the entire contents of which are incorporated herein by reference.

FIELD

Certain aspects of the embodiments discussed herein are related to coil structures, methods for manufacturing the coil structures, lead frames, and inductors.

BACKGROUND

In electric circuits, inductors may be used for purposes of stabilizing currents, converting voltages, or the like. In recent years, the size reduction of electronic devices, such as game consoles, smartphones, or the like, has accelerated. Consequently, there are demands to also reduce the size of the inductors provided in such electronic devices, and surface-mount type inductors have been proposed.

An example of such an inductor provided in the electronic device may have a configuration in which a coil structure is encapsulated by a resin. The coil structure may include windings formed from a thin metal plate, for example.

For example, Japanese Laid-Open Patent Publication No. 2020-027820 proposes an inductor having a relatively thin configuration.

In the coil structure having the windings formed from the thin metal plate, it is necessary to increase the number of turns in order to obtain a large induced electromotive force, however, it is difficult to increase the number of turns.

SUMMARY

Accordingly, it is an object in one aspect of the embodiments to provide a coil structure having a configuration which can easily increase the number of turns.

According to one aspect of the embodiments, a coil structure includes n metal plates that are laminated, where n is a natural number greater than or equal to two, wherein each of the n metal plates includes a spiral conductor, and a row of terminals, aligned in a predetermined direction on an outer side of the conductor, and formed by n+1 or more plate portions thicker than the conductor, wherein two ends of the conductor are connected to two adjacent plate portions for each of the n metal plates, wherein the row of terminals of a first metal plate is bonded to the row of terminals of a second metal plate which is adjacent to the first metal plate, among the n metal plates that are laminated, and wherein the two ends of the conductor of a lowermost metal plate among the n metal plates are connected to the two adjacent plate portions located at a first end of the lowermost metal plate, the two ends of the conductor of a second lowest metal plate among the n metal plates are connected to the two adjacent plate portions located at a position shifted one place toward a second end opposite to the first end of the second lowest metal plate, and the position where the two ends of the conductor connect to the two adjacent plate portions shifts one place toward the second end for each upward increase in level within a laminate along a laminated direction of the n metal plates, so that the conductors of each of the n metal plates are connected in series to form a spiral coil.

The object and advantages of the embodiments will be realized and attained by means of the elements and combinations particularly pointed out in the claims.

It is to be understood that both the foregoing general description and the following detailed description are exemplary and explanatory and not restrictive of the invention, as claimed.

DESCRIPTION OF EMBODIMENTS

Figure 1A:
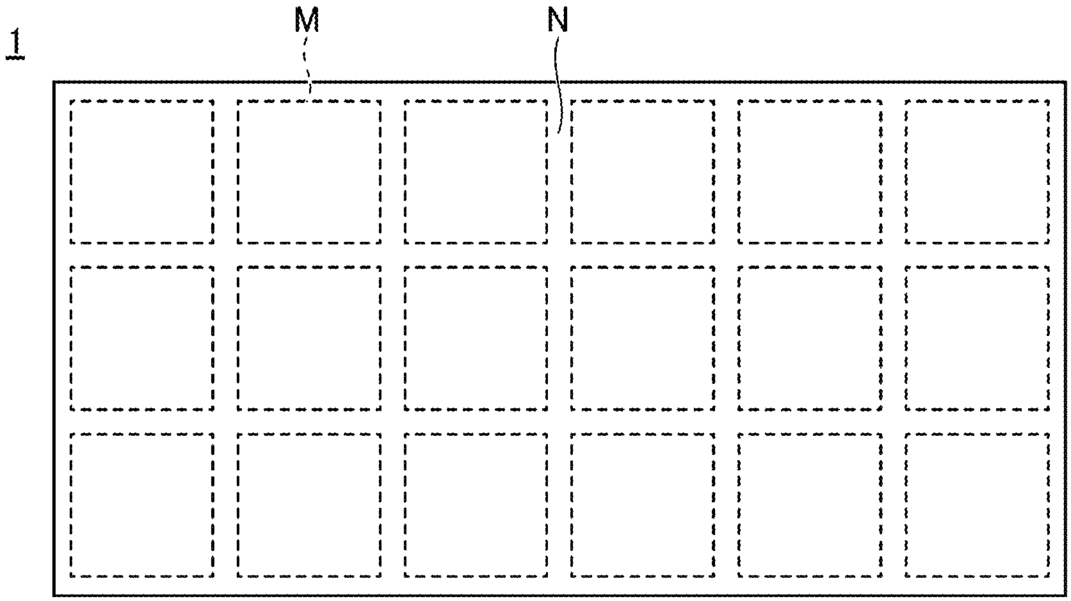
FIG. 1A and FIG. 1B are plan views illustrating an example of a coil structure according to a first embodiment.

Preferred embodiments of the present invention will be described with reference to the accompanying drawings. In the drawings, those parts that are the same are designated by the same reference numerals, and a repeated description of the same parts may be omitted.

A description will now be given of a coil structure, a method for manufacturing the coil structure, a lead frame, and an inductor according to each of the embodiments of the present invention.

First Embodiment

Figure 1B:
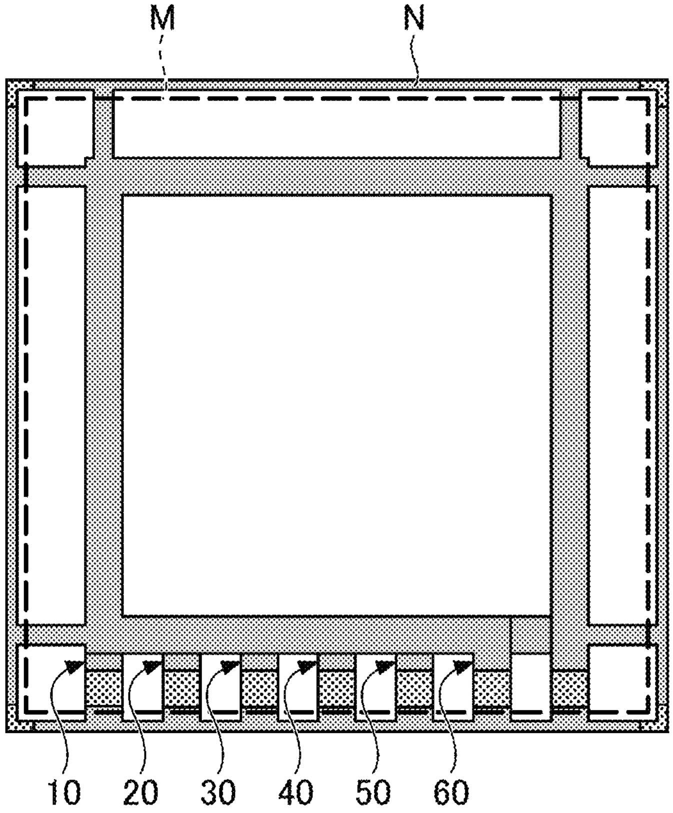
Figure 2:
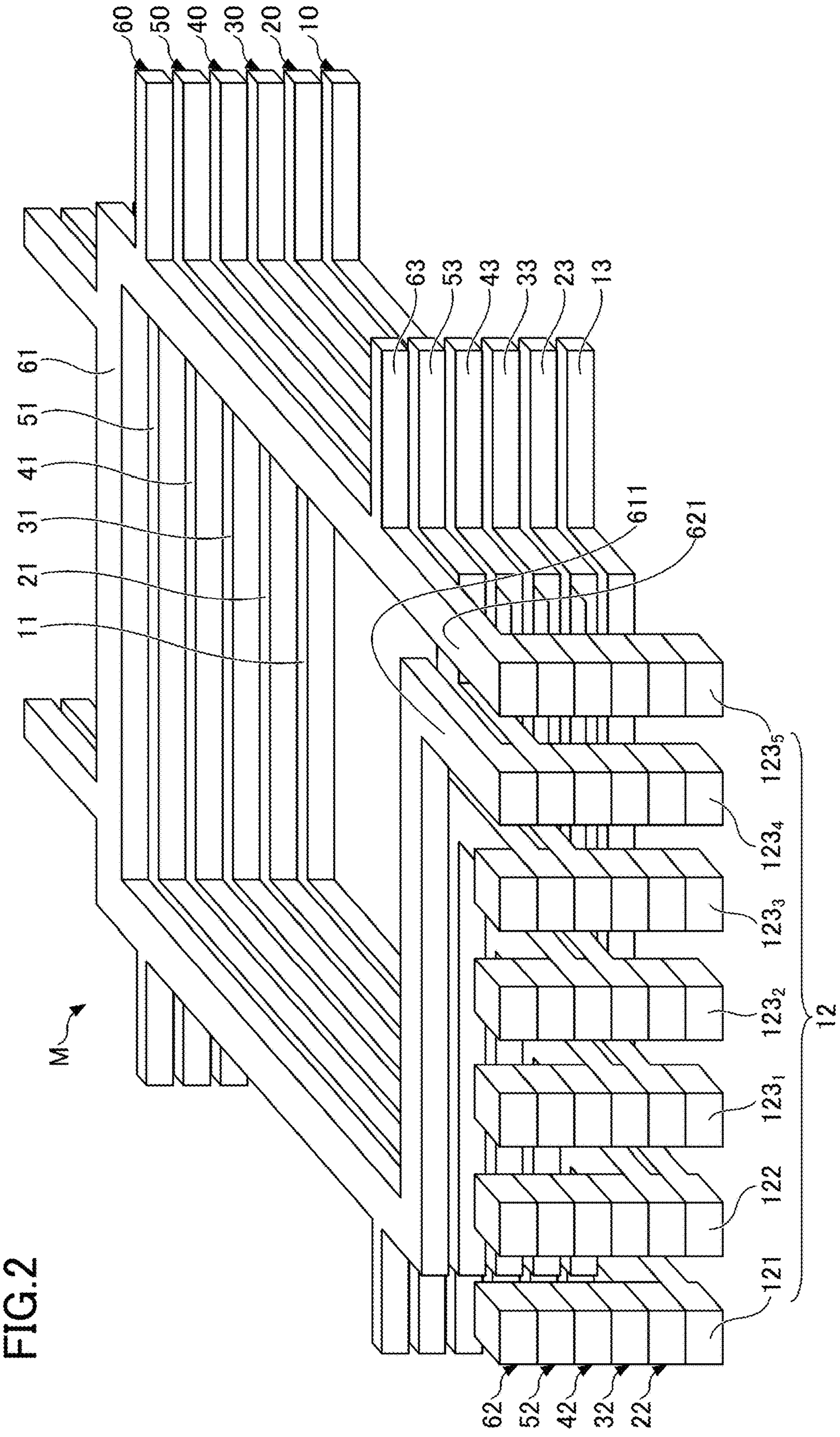
FIG. 2 is a perspective view of one product region illustrated in FIG. 1A.

FIG. 1A and FIG. 1B are plan views illustrating an example of the coil structure according to a first embodiment. FIG. 1A illustrates an overall view, and FIG. 1B illustrates an enlarged view of a vicinity of one product region (or product area) M in FIG. 1A. FIG. 2 is a perspective view of one product region M illustrated in FIG. 1A.

As illustrated in FIG. 1A, FIG. 1B, and FIG. 2, a coil structure 1 has a configuration in which a plurality of metal plates are laminated, and vertically adjacent metal plates are bonded to each other. The plurality of metal plates may be at least two layers, and in this case, the coil structure 1 has a two-layer configuration. However, in this embodiment, the example of the coil structure 1 is described as having a six-layer configuration in which a first metal plate 10, a second metal plate 20, a third metal plate 30, a fourth metal plate 40, a fifth metal plate 50, and a sixth metal plate 60 are successively laminated.

The coil structure 1 has a plurality of product regions M arranged vertically and horizontally in a checkerboard pattern in a plan view. Each product region M becomes an inductor after the entire coil structure 1 is encapsulated by a resin and singulated. A frame N having a picture-frame shape, which supports each product region M from a periphery thereof, is formed around each product region M. Adjacent frames N are integrally formed and connected to each other. FIG. 1A illustrates an example in which 18 (3 rows by 6 columns) product regions M are arranged, however, the number of product regions M is not particularly limited.

Figure 3A:
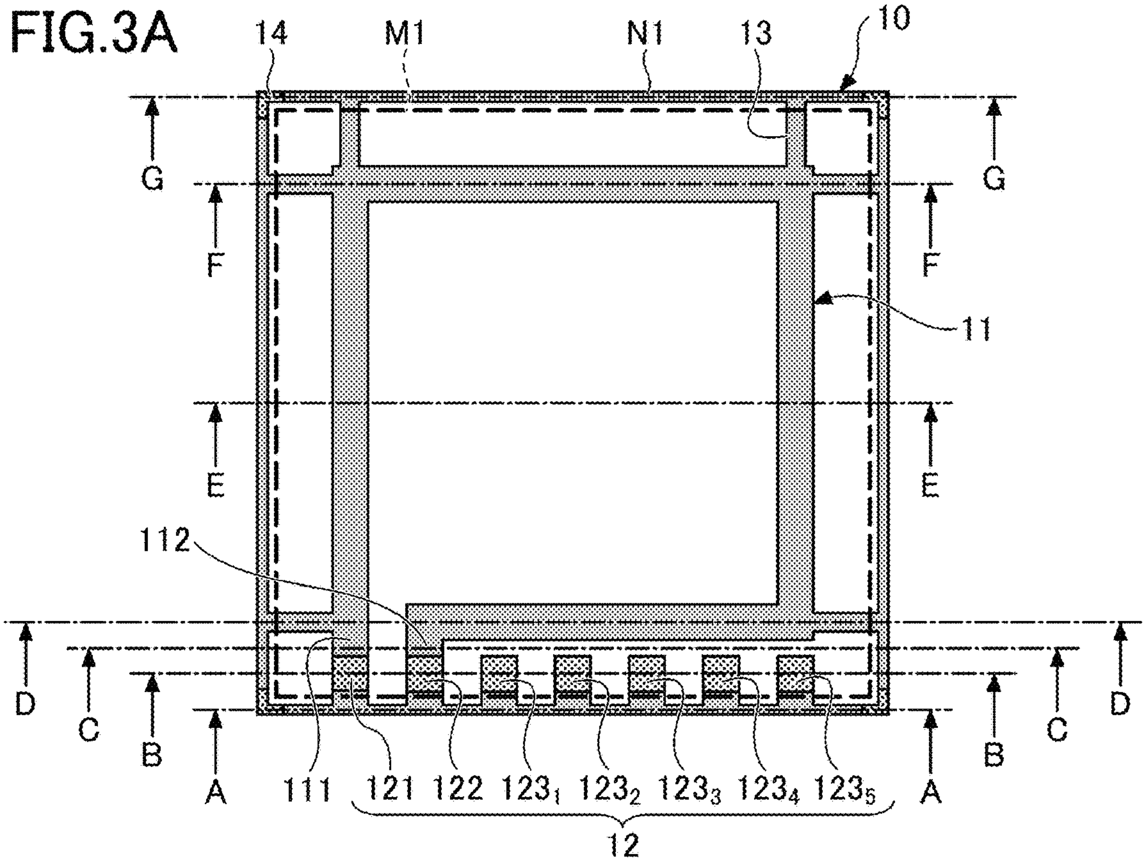
FIG. 3A and FIG. 3B are plan views (part 1) illustrating an example of a vicinity of the product region of each metal plate before lamination.
Figure 3B:
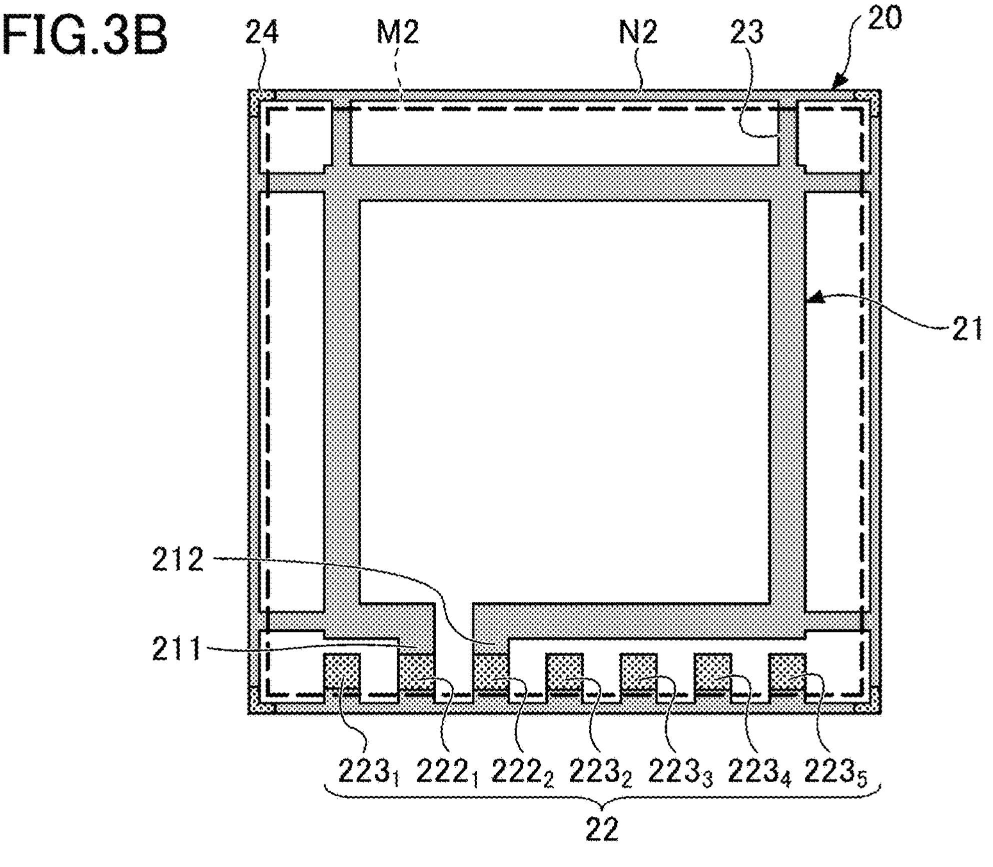
Figure 4A:
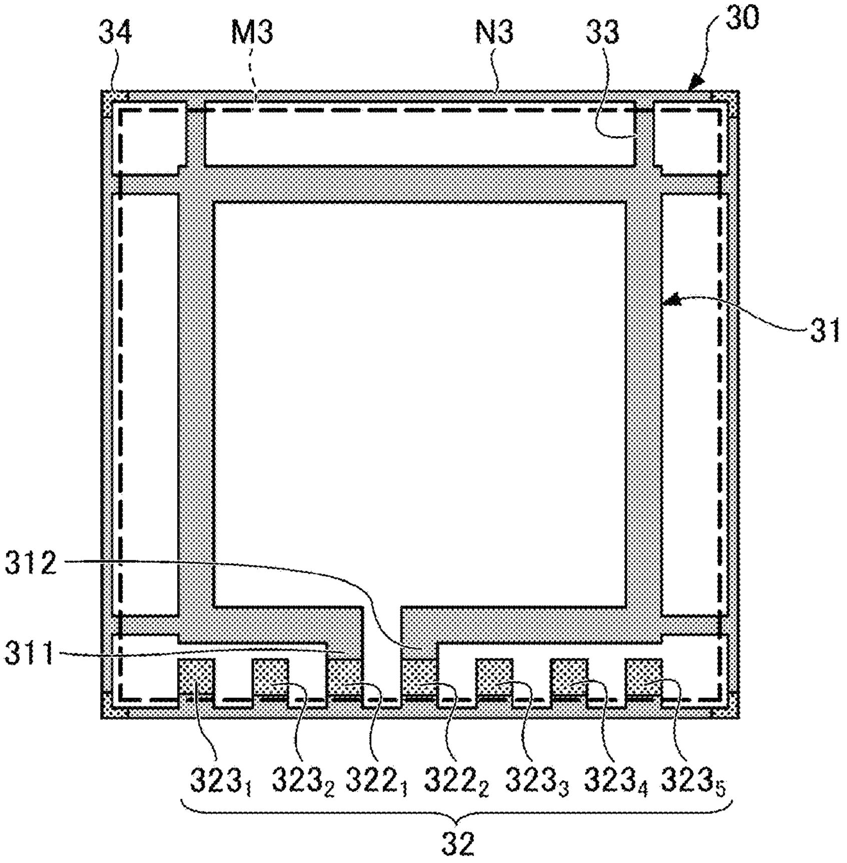
FIG. 4A and FIG. 4B are plans views (part 2) illustrating the example of the vicinity of the product region of each metal plate before lamination.
Figure 4B:
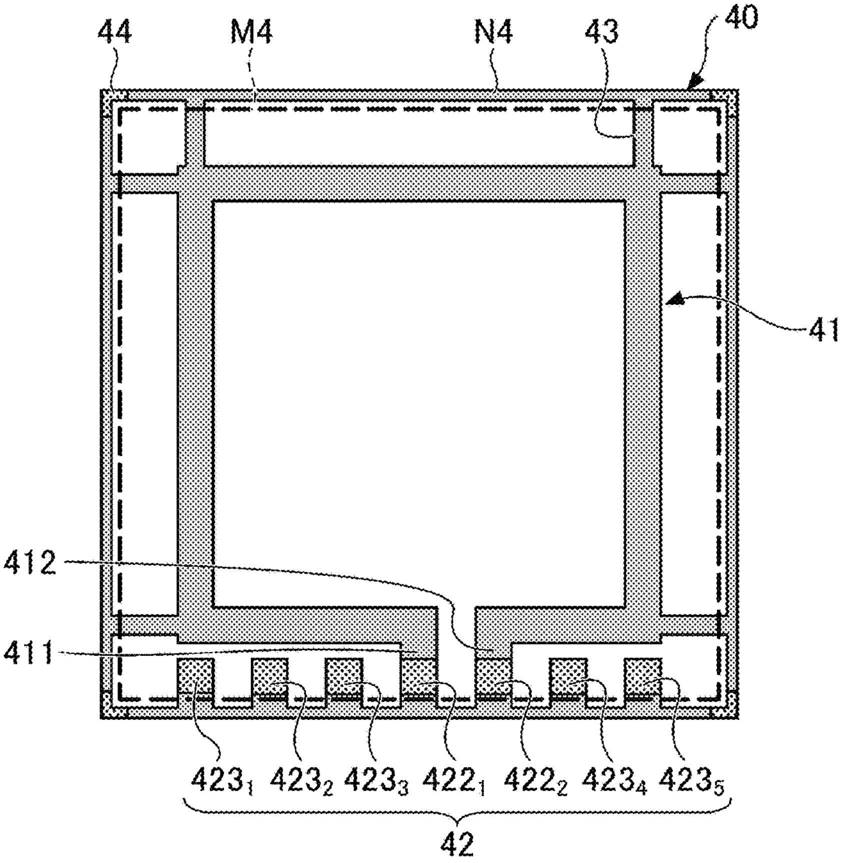
Figure 5A:
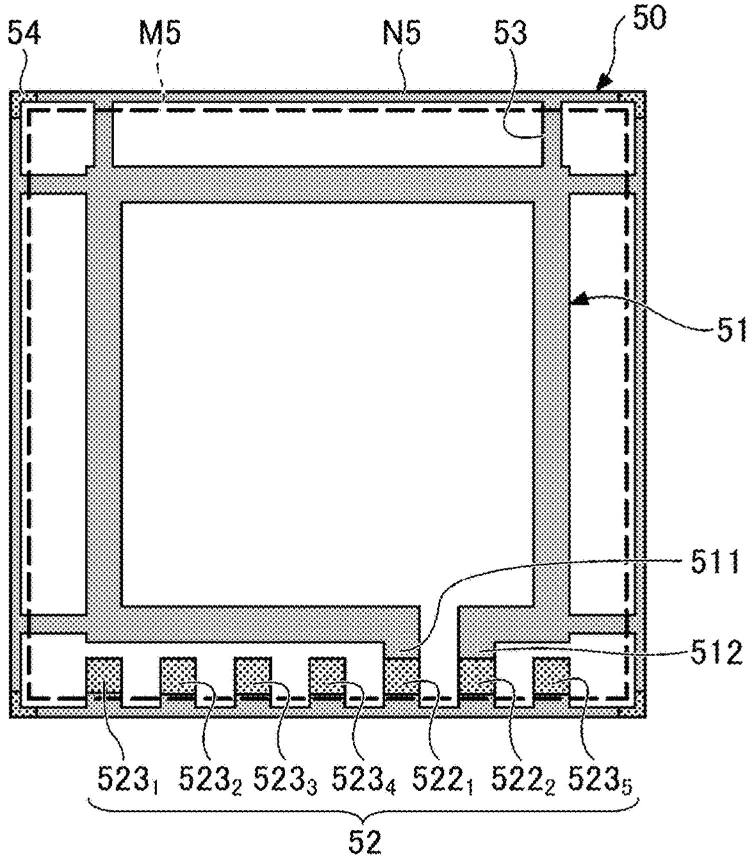
FIG. 5A and FIG. 5B are plan views (part 3) illustrating the example of the vicinity of the product region of each metal plate before lamination.
Figure 5B:
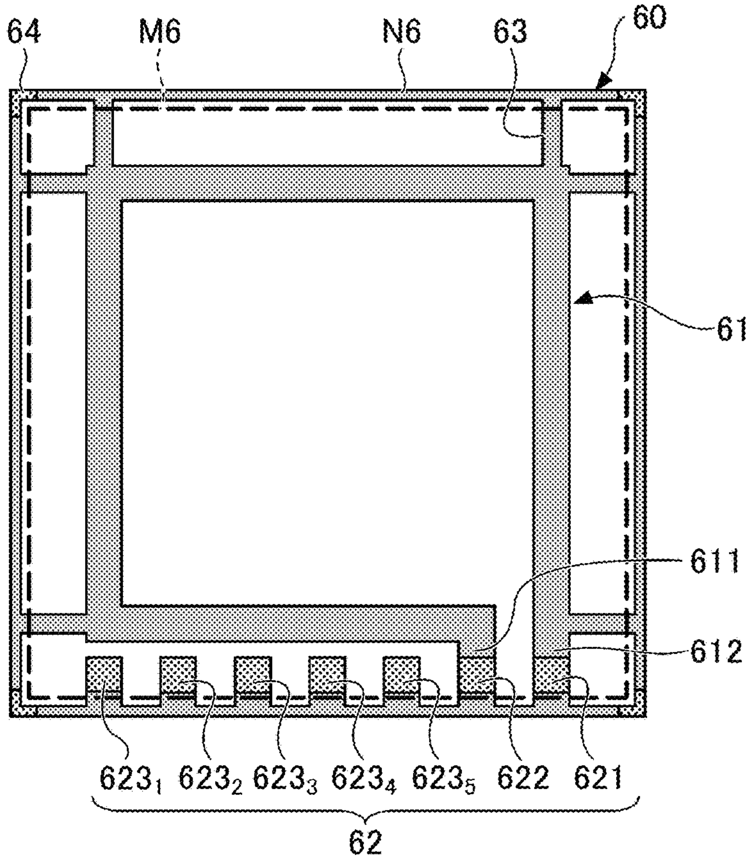

FIG. 3A through FIG. 5B are plan views illustrating an example of the vicinity of the product region of each metal plate before lamination. More particularly, FIG. 3A is a plan view of the first metal plate 10, and FIG. 3B is a plan view of the second metal plate 20. FIG. 4A is a plan view of the third metal plate 30, and FIG. 4B is a plan view of the fourth metal plate 40. FIG. 5A is a plan view of the fifth metal plate 50, and FIG. 5B is a plan view of the sixth metal plate 60.

Each of the first metal plate 10, the second metal plate 20, the third metal plate 30, the fourth metal plate 40, the fifth metal plate 50, and the sixth metal plate 60 has a planar shape similar to that of FIG. 1A. FIG. 3A through FIG. 5B illustrate an example of a portion (near one product region) of each metal plate corresponding to FIG. 1B. In FIG. 3A through FIG. 5B, a portion indicated in grey illustrates a thin plate portion, and a portion indicated by a halftone dot pattern illustrates a thick plate portion which is formed to be thicker than the thin plate portion and protrude below the thin plate portion. The thin plate portion and the thick plate portion are integrally formed.

The product regions M illustrated in FIG. 3A through FIG. 5B include a product region M1 of the first metal plate 10, a product region M2 of the second metal plate 20, a product region M3 of the third metal plate 30, a product region M4 of the fourth metal plate 40, a product region M5 of the fifth metal plate 50, and a product region M6 of the sixth metal plate 60. Further, the frames N illustrated in FIG. 3A through FIG. 5B include a frame N1 of the first metal plate 10, a frame N2 of the second metal plate 20, a frame N3 of the third metal plate 30, a frame N4 of the fourth metal plate 40, a frame N5 of the fifth metal plate 50, and a frame N6 of the sixth metal plate 60.

Figure 6A:
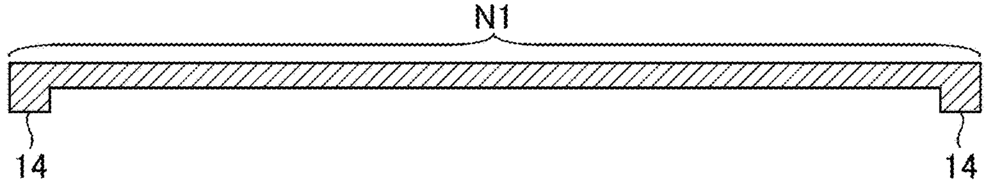
FIG. 6A, FIG. 6B, FIG. 6C, FIG. 6D, FIG. 6E, FIG. 6F, and FIG. 6G are cross sectional views of the coil structure along lines A-A through G-G in FIG. 3A, respectively.
Figure 6B:
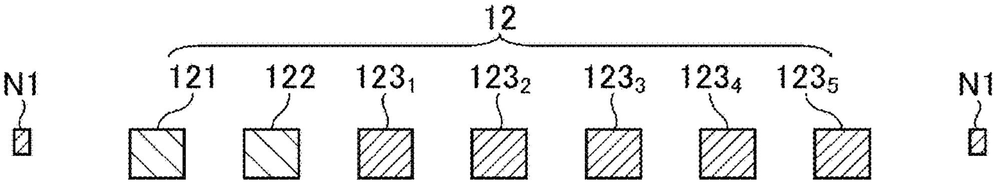
Figure 6C:
Figure 6D:
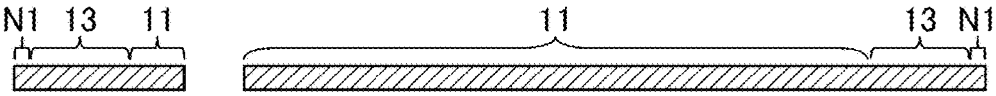
Figure 6E:
Figure 6F:
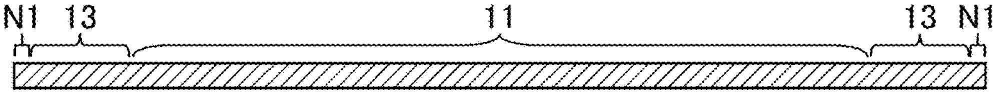
Figure 6G:
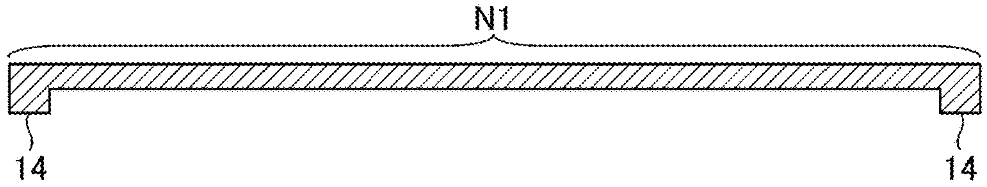

FIG. 6A through FIG. 6G are cross sectional views of the first metal plate 10 along lines A-A through G-G in FIG. 3A, respectively. More particularly, FIG. 6A is the cross sectional view of the first metal plate 10 along the line A-A in FIG. 3A. FIG. 6B is the cross sectional view of the first metal plate 10 along the line B-B in FIG. 3A. FIG. 6C is the cross sectional view of the first metal plate 10 along the line C-C in FIG. 3A. FIG. 6D is the cross sectional view of the first metal plate 10 along the line D-D in FIG. 3A. FIG. 6E is the cross sectional view of the first metal plate 10 along the line E-E line in FIG. 3A. FIG. 6F is the cross sectional view of the first metal plate 10 along the line F-F in FIG. 3A. FIG. 6G is the cross sectional view of the first metal plate 10 along the line G-G in FIG. 3A. For the sake of convenience in FIG. 6A through FIG. 6G, a portion of a row of terminals connected to a conductor (or wire) is indicated by a hatching different from other portions, and the same may be applied to the subsequent figures.

As illustrated in FIG. 3A through FIG. 6G, the product region M1 of the first metal plate 10 includes a conductor (or wire) 11 formed in a generally rectangular spiral shape, and a row 12 of terminals aligned in a predetermined direction on an outer side the generally rectangular spiral shape formed by the conductor 11. The conductor 11 is connected to the frame N1 by a plurality of connections 13 (six connections 13 in this example) extending from the inside of the product region M1 toward the outside of the product region M1. The number and connecting positions of connections 13 may be arbitrarily determined, respectively, as long as the conductor 11 can be stably supported on the frame N1. However, the connections 13 are preferably disposed near the corners of the generally rectangular spiral shape of the conductor 11.

The row 12 of terminals includes a terminal portion 121, a connecting portion 122, and support portions $\mathbf{123}_1$ through $\mathbf{123}_5$ that are arranged in this order from the left side of FIG. 3A at predetermined intervals. The conductor 11, the connections 13, and the frame N1 are thin plate portions formed to a predetermined thickness, and the terminal portion 121, the connecting portion 122, and the support portions $\mathbf{123}_1$ through $\mathbf{123}_5$ are thick plate portions having the same thickness that is thicker than the conductor 11 or the like. The planar shapes of the terminal portion 121, the connecting portion 122, and the support portions $\mathbf{123}_1$ through $\mathbf{123}_5$ are square or oblong shapes, for example.

Upper surfaces (surfaces on the side of the second metal plate 20) of the conductor 11, the connections 13, and the frame N1 are approximately coplanar with upper surfaces (surfaces on the side of the second metal plate 20) of the terminal portion 121, the connecting portion 122, and the support portions $\mathbf{123}_1$ through $\mathbf{123}_5$. On the other hand, lower surfaces of the conductor 11, the connections 13, and the frame N1 are located at positions recessed toward the second metal plate 20 from lower surfaces of the terminal portion 121, the connecting portion 122, and the support portions $123_1$ through $123_5$. In this example, when an inductor is manufactured from the coil structure 1 and mounted on a substrate, the surface facing the substrate is regarded as the lower surface, and the surface facing the opposite side is regarded as the upper surface, and the same shall apply hereinafter.

The frame N1 may include a first portion having the same thickness as the conductor 11, and a second portion having the same thickness as the thick plate portion forming the row 12 of terminals. For example, in order to reinforce the frame N1 and prevent inclination of the metal plate, a reinforcing portion 14 may be provided, as the second portion, at the four corners of the frame N1. In this case, a lower surface of the reinforcing portion 14 is approximately coplanar with the lower surface of the terminal portion 121 or the like. The reinforcing portion 14 may be formed to an L-shape, for example. In order to reinforce the frame N1 and prevent the inclination of the metal plate, the second portion (thick plate portion) may be provided at positions other than the corners of the frame N1, in place of or in addition to the reinforcing portion 14.

Thicknesses of the terminal portion 121, the connecting portion 122, and the support portions $123_1$ through $123_5$ may be approximately 50 μm to approximately 500 μm, for example. Thicknesses of the conductor 11, the connections 13, and the frame N1 may be approximately one-half of the thickness of the terminal portion 121 or the like, for example. In the case where the reinforcing portion 14 is provided on the frame N1, the thickness of the reinforcing portion 14 may be approximately the same as the thickness of the terminal portion 121 or the like.

The terminal portion 121 is disposed inside the product region M1, and has one end thereof extending outside the product region M1 and connected to the frame N1. The extending portion of the terminal portion 121 is a thin plate portion similar to the connections 13. The other end of the terminal portion 121 is connected to a start point 111 of the conductor 11. The connecting portion 122 is disposed inside the product region M1, and has one thereof extending outside the product region M1 and connected to the frame N1. The extending portion of the connecting portion 122 is a thin plate portion similar to the connections 13. The other end of the connecting portion 122 is connected to an end point 112 of the conductor 11.

The support portions $123_1$ through $123_5$ are disposed inside the product region M1, and respectively have one end thereof extending outside the product region M1 and connected to the frame N1. The extending portion of each of the support portions $123_1$ through $123_5$ is a thin plate portion similar to the connections 13. The other end of each of the support portions $123_1$ through $123_5$ is not connected to the conductor 11. In other words, the support portions $123_1$ through $123_5$ and the conductor 11 are not electrically connected. Hence, in the row 12 of terminals of the first metal plate 10, the thick plate portions other than the thick plate portions (the terminal portion 121 and the connecting portion 122) connected to both ends of the conductor 11 are electrically isolated from the conductor 11, and function as support portions supporting the thick plate portions of the rows of terminals of other metal plates.

As illustrated in FIG. 3B, the second metal plate 20 differs from the first metal plate 10 in that positions where the start point and the end point of the conductor connect to the row of terminals are shifted one place toward the right with respect to the first metal plate 10. Otherwise, the overall shape and thickness of the second metal plate 20 are the same as those of the first metal plate 10.

More particularly, the product region M2 of the second metal plate 20 includes a conductor 21 formed in a generally rectangular spiral shape, and a row 22 of terminals aligned in a predetermined direction on an outer side the generally rectangular spiral shape formed by the conductor 21. The conductor 21 is connected to the frame N2 by a plurality of connections 23 (six connections 23 in this example) extending from the inside of the product region M2 toward the outside of the product region M2. The number and connecting positions of connections 23 may be arbitrarily determined, respectively, as long as the conductor 21 can be stably supported on the frame N2. However, the connections 23 are preferably disposed near the corners of the generally rectangular spiral shape of the conductor 21.

The row 22 of terminals includes a support portion $223_1$, a connecting portion $222_1$, a connecting portion $222_2$, and support portions $223_2$ through $223_5$ that are arranged in this order from the left side of FIG. 3B at predetermined intervals. The conductor 21, the connections 23, and the frame N2 are thin plate portions formed to a predetermined thickness, and the connecting portion $222_1$, the connecting portion $222_2$, and the support portions $223_1$ through $223_5$ are thick plate portions having the same thickness that is thicker than the conductor 21 or the like. The planar shapes of the connecting portion $222_1$, the connecting portion $222_2$, and the support portions $223_1$ through $223_5$ are the same as the planar shapes of the terminal portion 121, the connecting portion 122, and the support portions $123_1$ through $123_5$, for example.

Upper surfaces (surfaces on the side of the third metal plate 30) of the conductor 21, the connections 23, and the frame N2 are approximately coplanar with upper surfaces (surfaces on the side of the third metal plate 30) of the connecting portion $222_1$, the connecting portion $222_2$, and the support portions $223_1$ through $223_5$. On the other hand, lower surfaces of the conductor 21, the connections 23, and the frame N2 are located at positions recessed toward the third metal plate 30 from lower surfaces of the connecting portion $222_1$, the connecting portion $222_2$, and the support portions $223_1$ through $223_5$.

The frame N2 may include a first portion having the same thickness as the conductor 21, and a second portion having the same thickness as the thick plate portion forming the row 22 of terminals. For example, in order to reinforce bonding with the adjacent metal plate and prevent inclination of the metal plate, a reinforcing portion 24 may be provided, as the second portion, at the four corners of the frame N2. In this case, a lower surface of the reinforcing portion 24 is approximately coplanar with the lower surface of the connecting portion $222_1$ or the like. The reinforcing portion 24 may be formed to an L-shape, for example. In order to reinforce the bonding with the adjacent metal plate and prevent the inclination of the metal plate, the second portion (thick plate portion) may be provided at positions other than the corners of the frame N2, in place of or in addition to the reinforcing portion 24.

Thicknesses of the conductor 21, the connections 23, and the frame N2 may be the same as that of the conductor 11 or the like, for example. Thicknesses of the connecting portion $222_1$, the connecting portion $222_2$, and the support portions $223_1$ through $223_5$ may be the same as that of the terminal portion 121 or the like, for example.

The connecting portions $222_1$ and $222_2$ are disposed inside the product region M2, and have one end thereof extending outside the product region M2 and connected to the frame N2. The extending portion of each of the connecting portions $222_1$ and $222_2$ is a thin plate portion similar to the connections 23. The other end of the connecting portion $222_1$ is connected to a start point 211 of the conductor 21. The other end of the connecting portion $222_2$ is connected to an end point 212 of the conductor 21.

The support portions $223_1$ through $223_5$ are disposed inside the product region M2, and respectively have one end thereof extending outside the product region M2 and connected to the frame N2. The extending portion of each of the support portions $223_1$ through $223_5$ is a thin plate portion similar to the connections 23. The other end of each of the support portions $223_1$ through $223_5$ is not connected to the conductor 21. In other words, the support portions $223_1$ through $223_5$ and the conductor 21 are not electrically connected. Hence, in the row 22 of terminals of the second metal plate 20, the thick plate portions other than the thick plate portions (the connecting portions $222_1$ and $222_2$) connected to both ends of the conductor 21 are electrically isolated from the conductor 21, and function as support portions supporting the thick plate portions of the rows of terminals of other metal plates.

As illustrated in FIG. 4A, the third metal plate 30 differs from the second metal plate 20 in that positions where the start point and the end point of the conductor connect to the row of terminals are shifted one place toward the right with respect to the second metal plate 20. Otherwise, the overall shape and thickness of the third metal plate 30 are the same as those of the second metal plate 20.

More particularly, the product region M3 of the third metal plate 30 includes a conductor 31 formed in a generally rectangular spiral shape, and a row 32 of terminals aligned in a predetermined direction on an outer side the generally rectangular spiral shape formed by the conductor 31. The conductor 31 is connected to the frame N2 by a plurality of connections 33 (six connections 33 in this example) extending from the inside of the product region M3 toward the outside of the product region M3. The number and connecting positions of connections 33 may be arbitrarily determined, respectively, as long as the conductor 31 can be stably supported on the frame N3. However, the connections 33 are preferably disposed near the corners of the generally rectangular spiral shape of the conductor 31.

The row 32 of terminals includes support portions $323_1$ and $323_2$, a connecting portion $322_1$, a connecting portion $322_2$, and support portions $323_3$ through $323_5$ that are arranged in this order from the left side of FIG. 4A at predetermined intervals. The conductor 31, the connections 33, and the frame N3 are thin plate portions formed to a predetermined thickness, and the connecting portion $322_1$, the connecting portion $322_2$, and the support portions $323_1$ through $323_5$ are thick plate portions having the same thickness that is thicker than the conductor 31 or the like. The planar shapes of the connecting portion $322_1$, the connecting portion $322_2$, and the support portions $323_1$ through $323_5$ are the same as the planar shapes of the terminal portion 121, the connecting portion 122, and the support portions $123_1$ through $123_5$, for example.

Upper surfaces (surfaces on the side of the fourth metal plate 40) of the conductor 31, the connections 33, and the frame N3 are approximately coplanar with upper surfaces (surfaces on the side of the fourth metal plate 40) of the connecting portion $322_1$, the connecting portion $322_2$, and the support portions $323_1$ through $323_5$. On the other hand, lower surfaces of the conductor 31, the connections 33, and the frame N3 are located at positions recessed toward the fourth metal plate 40 from lower surfaces of the connecting portion $322_1$, the connecting portion $322_2$, and the support portions $323_1$ through $323_5$.

The frame N3 may include a first portion having the same thickness as the conductor 31, and a second portion having the same thickness as the thick plate portion forming the row 32 of terminals. For example, in order to reinforce bonding with the adjacent metal plate and prevent inclination of the metal plate, a reinforcing portion 34 may be provided, as the second portion, at the four corners of the frame N3. In this case, a lower surface of the reinforcing portion 34 is approximately coplanar with the lower surface of the connecting portion $322_1$ or the like. The reinforcing portion 34 may be formed to an L-shape, for example. In order to reinforce the bonding with the adjacent metal plate and prevent the inclination of the metal plate, the second portion (thick plate portion) may be provided at positions other than the corners of the frame N3, in place of or in addition to the reinforcing portion 34.

Thicknesses of the conductor 31, the connections 33, and the frame N3 may be the same as that of the conductor 11 or the like, for example. Thicknesses of the connecting portion $322_1$, the connecting portion $322_2$, and the support portions $323_1$ through $323_5$ may be the same as that of the terminal portion 121 or the like, for example.

The connecting portions $322_1$ and $322_2$ are disposed inside the product region M3, and have one end thereof extending outside the product region M3 and connected to the frame N3. The extending portion of each of the connecting portions $322_1$ and $322_2$ is a thin plate portion similar to the connections 33. The other end of the connecting portion $322_1$ is connected to a start point 311 of the conductor 31. The other end of the connecting portion $322_2$ is connected to an end point 312 of the conductor 31.

The support portions $323_1$ through $323_5$ are disposed inside the product region M3, and respectively have one end thereof extending outside the product region M3 and connected to the frame N3. The extending portion of each of the support portions $323_1$ through $323_5$ is a thin plate portion similar to the connections 33. The other end of each of the support portions $323_1$ through $323_5$ is not connected to the conductor 31. In other words, the support portions $323_1$ through $323_5$ and the conductor 31 are not electrically connected. Hence, in the row 32 of terminals of the third metal plate 30, the thick plate portions other than the thick plate portions (the connecting portions $322_1$ and $322_2$) connected to both ends of the conductor 31 are electrically isolated from the conductor 31, and function as support portions supporting the thick plate portions of the rows of terminals of other metal plates.

As illustrated in FIG. 4B, the fourth metal plate 40 differs from the third metal plate 30 in that positions where the start point and the end point of the conductor connect to the row of terminals are shifted one place toward the right with respect to the third metal plate 30. Otherwise, the overall shape and thickness of the fourth metal plate 40 are the same as those of the third metal plate 30.

More particularly, the product region M4 of the fourth metal plate 40 includes a conductor 41 formed in a generally rectangular spiral shape, and a row 42 of terminals aligned in a predetermined direction on an outer side the generally rectangular spiral shape formed by the conductor 41. The conductor 41 is connected to the frame N4 by a plurality of connections 43 (six connections 43 in this example) extending from the inside of the product region M4 toward the outside of the product region M4. The number and connecting positions of connections 43 may be arbitrarily determined, respectively, as long as the conductor 41 can be stably supported on the frame N4. However, the connections 43 are preferably disposed near the corners of the generally rectangular spiral shape of the conductor 41.

The row 42 of terminals includes support portions $\mathbf{423_1}$ through $\mathbf{423_3}$, a connecting portion $\mathbf{422_1}$, a connecting portion $\mathbf{422_2}$, and support portions $\mathbf{423_4}$ and $\mathbf{423_5}$ that are arranged in this order from the left side of FIG. 4B at predetermined intervals. The conductor 41, the connections 43, and the frame N4 are thin plate portions formed to a predetermined thickness, and the connecting portion $\mathbf{422_1}$, the connecting portion $\mathbf{422_2}$, and the support portions $\mathbf{423_1}$ through $\mathbf{423_5}$ are thick plate portions having the same thickness that is thicker than the conductor 41 or the like. The planar shapes of the connecting portion $\mathbf{422_1}$, the connecting portion $\mathbf{422_2}$, and the support portions $\mathbf{423_1}$ through $\mathbf{423_5}$ are the same as the planar shapes of the terminal portion 121, the connecting portion 122, and the support portions $\mathbf{123_1}$ through $\mathbf{123_5}$, for example.

Upper surfaces (surfaces on the side of the fifth metal plate 50) of the conductor 41, the connections 43, and the frame N4 are approximately coplanar with upper surfaces (surfaces on the side of the fifth metal plate 50) of the connecting portion $\mathbf{422_1}$, the connecting portion $\mathbf{422_2}$, and the support portions $\mathbf{423_1}$ through $\mathbf{423_5}$. On the other hand, lower surfaces of the conductor 41, the connections 43, and the frame N4 are located at positions recessed toward the fifth metal plate 50 from lower surfaces of the connecting portion $\mathbf{422_1}$, the connecting portion $\mathbf{422_2}$, and the support portions $\mathbf{423_1}$ through $\mathbf{423_5}$.

The frame N4 may include a first portion having the same thickness as the conductor 41, and a second portion having the same thickness as the thick plate portion forming the row 42 of terminals. For example, in order to reinforce bonding with the adjacent metal plate and prevent inclination of the metal plate, a reinforcing portion 44 may be provided, as the second portion, at the four corners of the frame N4. In this case, a lower surface of the reinforcing portion 44 is approximately coplanar with the lower surface of the connecting portion $\mathbf{422_1}$ or the like. The reinforcing portion 44 may be formed to an L-shape, for example. In order to reinforce the bonding with the adjacent metal plate and prevent the inclination of the metal plate, the second portion (thick plate portion) may be provided at positions other than the corners of the frame N4, in place of or in addition to the reinforcing portion 44.

Thicknesses of the conductor 41, the connections 43, and the frame N4 may be the same as that of the conductor 11 or the like, for example. Thicknesses of the connecting portion $\mathbf{422_2}$, the connecting portion $\mathbf{422_2}$, and the support portions $\mathbf{423_1}$ through $\mathbf{423_5}$ may be the same as that of the terminal portion 121 or the like, for example.

The connecting portions $\mathbf{422_1}$ and $\mathbf{422_2}$ are disposed inside the product region M4, and have one end thereof extending outside the product region M4 and connected to the frame N4. The extending portion of each of the connecting portions $\mathbf{422_1}$ and $\mathbf{422_2}$ is a thin plate portion similar to the connections 43. The other end of the connecting portion $\mathbf{422_1}$ is connected to a start point 411 of the conductor 41. The other end of the connecting portion $\mathbf{422_2}$ is connected to an end point 412 of the conductor 41.

The support portions $\mathbf{423_1}$ through $\mathbf{423_5}$ are disposed inside the product region M4, and respectively have one end thereof extending outside the product region M4 and connected to the frame N4. The extending portion of each of the support portions $\mathbf{423_1}$ through $\mathbf{423_5}$ is a thin plate portion similar to the connections 43. The other end of each of the support portions $\mathbf{423_1}$ through $\mathbf{423_5}$ is not connected to the conductor 41. In other words, the support portions $\mathbf{423_1}$ through $\mathbf{423_5}$ and the conductor 41 are not electrically connected. Hence, in the row 42 of terminals of the fourth metal plate 40, the thick plate portions other than the thick plate portions (the connecting portions $\mathbf{422_1}$ and $\mathbf{422_2}$) connected to both ends of the conductor 41 are electrically isolated from the conductor 41, and function as support portions supporting the thick plate portions of the rows of terminals of other metal plates.

As illustrated in FIG. 5A, the fifth metal plate 50 differs from the fourth metal plate 40 in that positions where the start point and the end point of the conductor connect to the row of terminals are shifted one place toward the right with respect to the fourth metal plate 40. Otherwise, the overall shape and thickness of the fifth metal plate 50 are the same as those of the fourth metal plate 40.

More particularly, the product region M5 of the fifth metal plate 50 includes a conductor 51 formed in a generally rectangular spiral shape, and a row 52 of terminals aligned in a predetermined direction on an outer side the generally rectangular spiral shape formed by the conductor 51. The conductor 51 is connected to the frame N5 by a plurality of connections 53 (six connections 53 in this example) extending from the inside of the product region M5 toward the outside of the product region M5. The number and connecting positions of connections 53 may be arbitrarily determined, respectively, as long as the conductor 51 can be stably supported on the frame N5. However, the connections 53 are preferably disposed near the corners of the generally rectangular spiral shape of the conductor 51.

The row 52 of terminals includes support portions $\mathbf{523_1}$ through $\mathbf{523_4}$, a connecting portion $\mathbf{522_1}$, a connecting portion $\mathbf{522_2}$, and a support portion $\mathbf{523_5}$ that are arranged in this order from the left side of FIG. 5A at predetermined intervals. The conductor 51, the connections 53, and the frame N5 are thin plate portions formed to a predetermined thickness, and the connecting portion $\mathbf{522_1}$, the connecting portion $\mathbf{522_2}$, and the support portions $\mathbf{523_1}$ through $\mathbf{523_5}$ are thick plate portions having the same thickness that is thicker than the conductor 51 or the like. The planar shapes of the connecting portion $\mathbf{522_1}$, the connecting portion $\mathbf{522_2}$, and the support portions $\mathbf{523_1}$ through $\mathbf{523_5}$ are the same as the planar shapes of the terminal portion 121, the connecting portion 122, and the support portions $\mathbf{123_1}$ through $\mathbf{123_5}$, for example.

Upper surfaces (surfaces on the side of the sixth metal plate 60) of the conductor 51, the connections 53, and the frame N5 are approximately coplanar with upper surfaces (surfaces on the side of the sixth metal plate 60) of the connecting portion $\mathbf{522_1}$, the connecting portion $\mathbf{522_2}$, and the support portions $\mathbf{523_1}$ through $\mathbf{523_5}$. On the other hand, lower surfaces of the conductor 51, the connections 53, and the frame N5 are located at positions recessed toward the sixth metal plate 60 from lower surfaces of the connecting portion $\mathbf{522_1}$, the connecting portion $\mathbf{522_2}$, and the support portions $\mathbf{523_1}$ through $\mathbf{523_5}$.

The frame N5 may include a first portion having the same thickness as the conductor 51, and a second portion having the same thickness as the thick plate portion forming the row 52 of terminals. For example, in order to reinforce bonding with the adjacent metal plate and prevent inclination of the metal plate, a reinforcing portion 54 may be provided, as the second portion, at the four corners of the frame N5. In this case, a lower surface of the reinforcing portion 54 is approximately coplanar with the lower surface of the connecting portion $\mathbf{522_1}$ or the like. The reinforcing portion 54 may be formed to an L-shape, for example. In order to reinforce the bonding with the adjacent metal plate and prevent the inclination of the metal plate, the second portion (thick plate portion) may be provided at positions other than the corners of the frame N5, in place of or in addition to the reinforcing portion 54.

Thicknesses of the conductor 51, the connections 53, and the frame N5 may be the same as that of the conductor 11 or the like, for example. Thicknesses of the connecting portion $\mathbf{522_1}$, the connecting portion $\mathbf{522_2}$, and the support portions $\mathbf{523_1}$ through $\mathbf{523_5}$ may be the same as that of the terminal portion 121 or the like, for example.

The connecting portions $\mathbf{522_1}$ and $\mathbf{522_2}$ are disposed inside the product region M5, and have one end thereof extending outside the product region M5 and connected to the frame N5. The extending portion of each of the connecting portions $\mathbf{522_1}$ and $\mathbf{522_2}$ is a thin plate portion similar to the connections 53. The other end of the connecting portion $\mathbf{522_1}$ is connected to a start point 511 of the conductor 51. The other end of the connecting portion $\mathbf{522_2}$ is connected to an end point 512 of the conductor 51.

The support portions $\mathbf{523_1}$ through $\mathbf{523_5}$ are disposed inside the product region M5, and respectively have one end thereof extending outside the product region M5 and connected to the frame N5. The extending portion of each of the support portions $\mathbf{523_1}$ through $\mathbf{523_5}$ is a thin plate portion similar to the connections 53. The other end of each of the support portions $\mathbf{523_1}$ through $\mathbf{523_5}$ is not connected to the conductor 51. In other words, the support portions $\mathbf{523_1}$ through $\mathbf{523_5}$ and the conductor 51 are not electrically connected. Hence, in the row 52 of terminals of the fifth metal plate 50, the thick plate portions other than the thick plate portions (the connecting portions $\mathbf{522_1}$ and $\mathbf{522_2}$) connected to both ends of the conductor 51 are electrically isolated from the conductor 51, and function as support portions supporting the thick plate portions of the rows of terminals of other metal plates.

As illustrated in FIG. 5B, the sixth metal plate 60 differs from the fifth metal plate 50 in that positions where the start point and the end point of the conductor connect to the row of terminals are shifted one place toward the right with respect to the fifth metal plate 50. Otherwise, the overall shape and thickness of the sixth metal plate 60 are the same as those of the fifth metal plate 50.

More particularly, the product region M6 of the sixth metal plate 60 includes a conductor 61 formed in a generally rectangular spiral shape, and a row 62 of terminals aligned in a predetermined direction on an outer side the generally rectangular spiral shape formed by the conductor 61. The conductor 61 is connected to the frame N6 by a plurality of connections 63 (six connections 63 in this example) extending from the inside of the product region M6 toward the outside of the product region M6. The number and connecting positions of connections 63 may be arbitrarily determined, respectively, as long as the conductor 61 can be stably supported on the frame N6. However, the connections 63 are preferably disposed near the corners of the generally rectangular spiral shape of the conductor 61.

The row 62 of terminals includes support portions $\mathbf{623_1}$ through $\mathbf{623_5}$, a connecting portion 622, and a terminal portion 621 that are arranged in this order from the left side of FIG. 5B at predetermined intervals. The conductor 61, the connections 63, and the frame N6 are thin plate portions formed to a predetermined thickness, and the terminal portion 621, the connecting portion 622, and the support portions $\mathbf{623_1}$ through $\mathbf{623_5}$ are thick plate portions having the same thickness that is thicker than the conductor 61 or the like. The planar shapes of the terminal portion 621, the connecting portion 622, and the support portions $\mathbf{623_1}$ through $\mathbf{623_5}$ are the same as the planar shapes of the terminal portion 121, the connecting portion 122, and the support portions $\mathbf{123_1}$ through $\mathbf{123_5}$, for example.

Upper surfaces (surfaces on the side opposite from the fifth metal plate 50) of the conductor 61, the connections 63, and the frame N6 are approximately coplanar with upper surfaces (surfaces on the side opposite from the fifth metal plate 50) of the terminal portion 621, the connecting portion 622, and the support portions $\mathbf{623_1}$ through $\mathbf{623_5}$. On the other hand, lower surfaces of the conductor 61, the connections 63, and the frame N6 are located at positions recessed toward a direction opposite from the fifth metal plate 50 from lower surfaces of the terminal portion 621, connecting portion 622, and the support portions $\mathbf{623_1}$ through $\mathbf{623_5}$.

The frame N6 may include a first portion having the same thickness as the conductor 61, and a second portion having the same thickness as the thick plate portion forming the row 62 of terminals. For example, in order to reinforce bonding with the adjacent metal plate and prevent inclination of the metal plate, a reinforcing portion 64 may be provided, as the second portion, at the four corners of the frame N6. In this case, a lower surface of the reinforcing portion 64 is approximately coplanar with the lower surface of the connecting portion 622 or the like. The reinforcing portion 64 may be formed to an L-shape, for example. In order to reinforce the bonding with the adjacent metal plate and prevent the inclination of the metal plate, the second portion (thick plate portion) may be provided at positions other than the corners of the frame N6, in place of or in addition to the reinforcing portion 64.

Thicknesses of the conductor 61, the connections 63, and the frame N6 may be the same as that of the conductor 11 or the like, for example. Thicknesses of the terminal portion 621, the connecting portion 622, and the support portions $\mathbf{623_1}$ through $\mathbf{623_5}$ may be the same as that of the terminal portion 121 or the like, for example.

The connecting portion 622 is disposed inside the product region M6, and has one end thereof extending outside the product region M6 and connected to the frame N6. The extending portion of the connecting portion 622 is a thin plate portion similar to the connections 63. The other end of the connecting portion 622 is connected to a start point 611 of the conductor 61. The terminal portion 621 is disposed inside the product region M6, and has one end thereof extending outside the product region M6 and connected to the frame N6. The extending portion of the terminal portion 621 is a thin plate portion similar to the connections 63. The other end of the terminal portion 621 is connected to an end point 612 of the conductor 61.

The support portions $\mathbf{623_1}$ through $\mathbf{623_5}$ are disposed inside the product region M6, and respectively have one end thereof extending outside the product region M6 and connected to the frame N6. The extending portion of each of the support portions $\mathbf{623_1}$ through $\mathbf{623_5}$ is a thin plate portion similar to the connections 63. The other end of each of the support portions $\mathbf{623_1}$ through $\mathbf{623_5}$ is not connected to the conductor 61. In other words, the support portions $\mathbf{623_1}$ through $\mathbf{623_5}$ and the conductor 61 are not electrically connected. Hence, in the row 62 of terminals of the sixth metal plate 60, the thick plate portions other than the thick plate portions (the connecting portion 622 and the terminal portion 621) connected to both ends of the conductor 61 are electrically isolated from the conductor 61, and function as support portions supporting the thick plate portions of the rows of terminals of other metal plates.

Figure 7A:
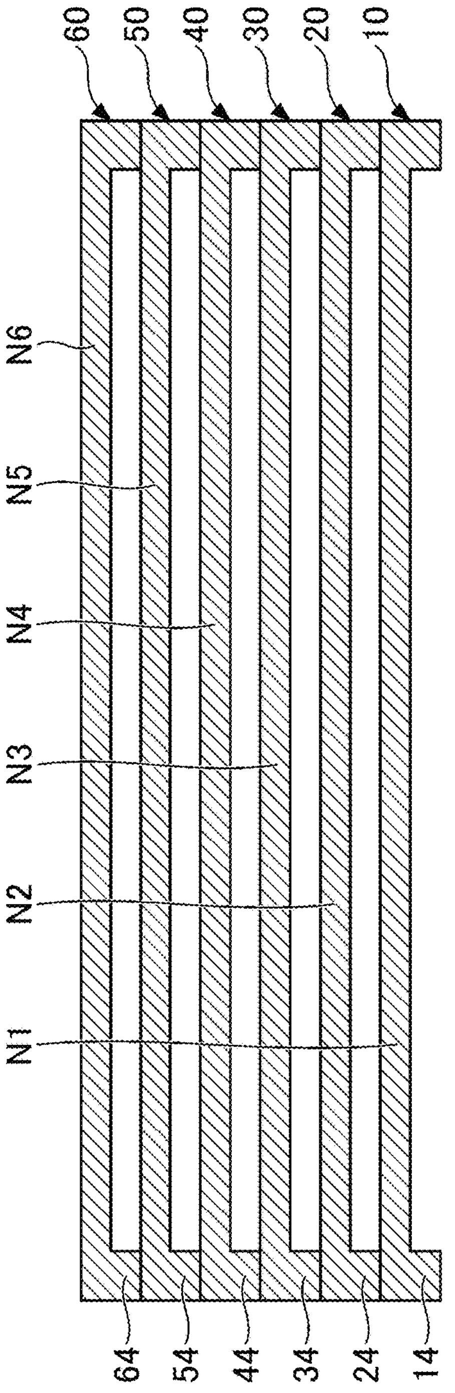
FIG. 7A and FIG. 7B are cross sectional views of the coil structure along the lines A-A and B-B in FIG. 3A, respectively.
Figure 7B:
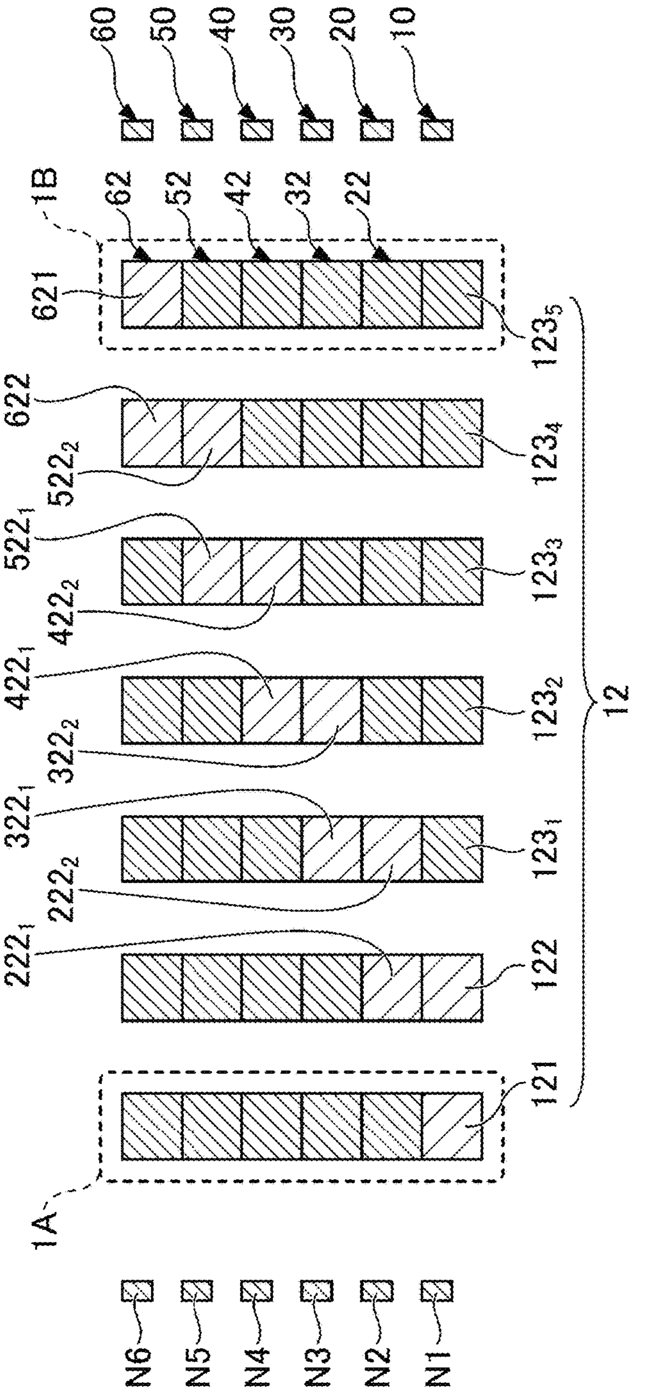
Figure 8A:
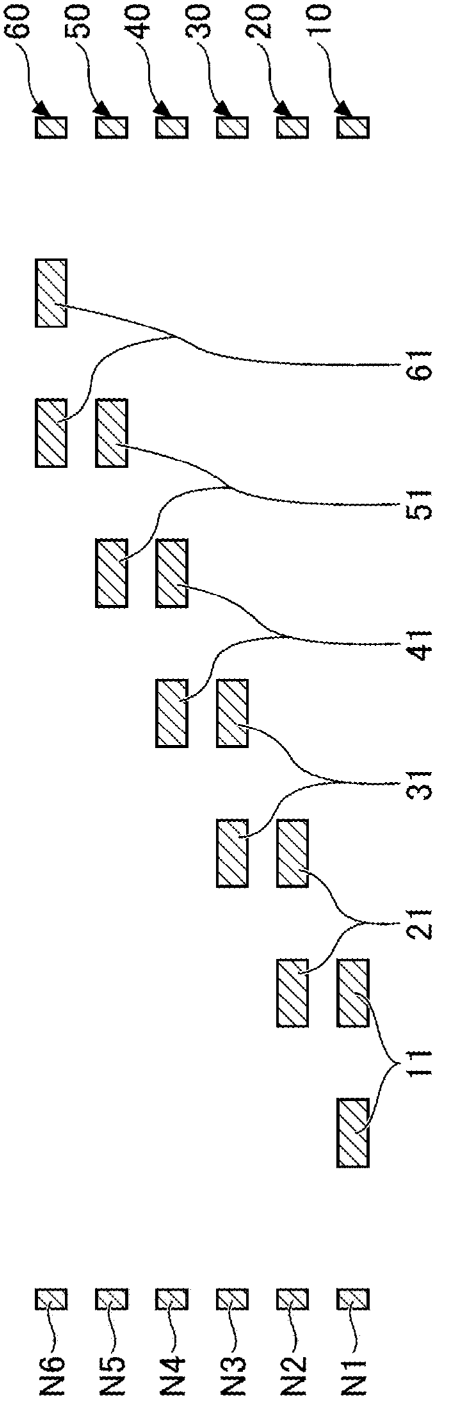
FIG. 8A and FIG. 8B are cross sectional views of the coil structure along the lines C-C and D-D in FIG. 3A, respectively.
Figure 8B:
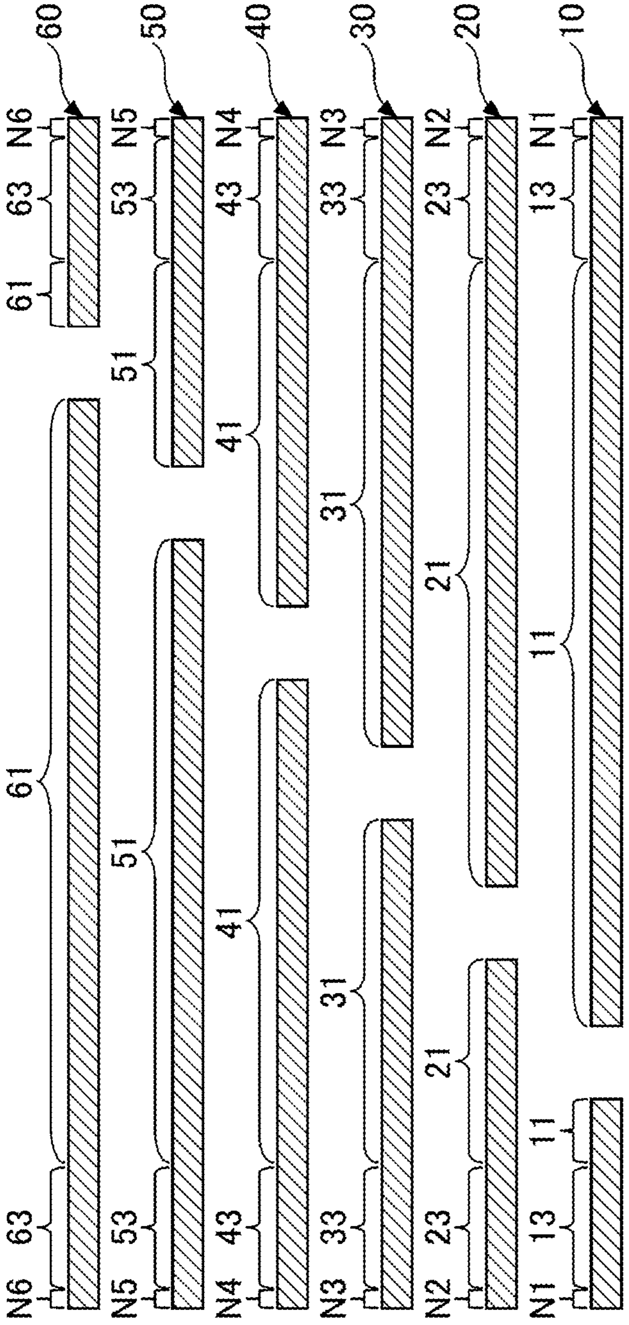
Figure 9A:
FIG. 9A and FIG. 9B are cross sectional views of the coil structure along the lines E-E and F-F in FIG. 3A, respectively.
Figure 9B:
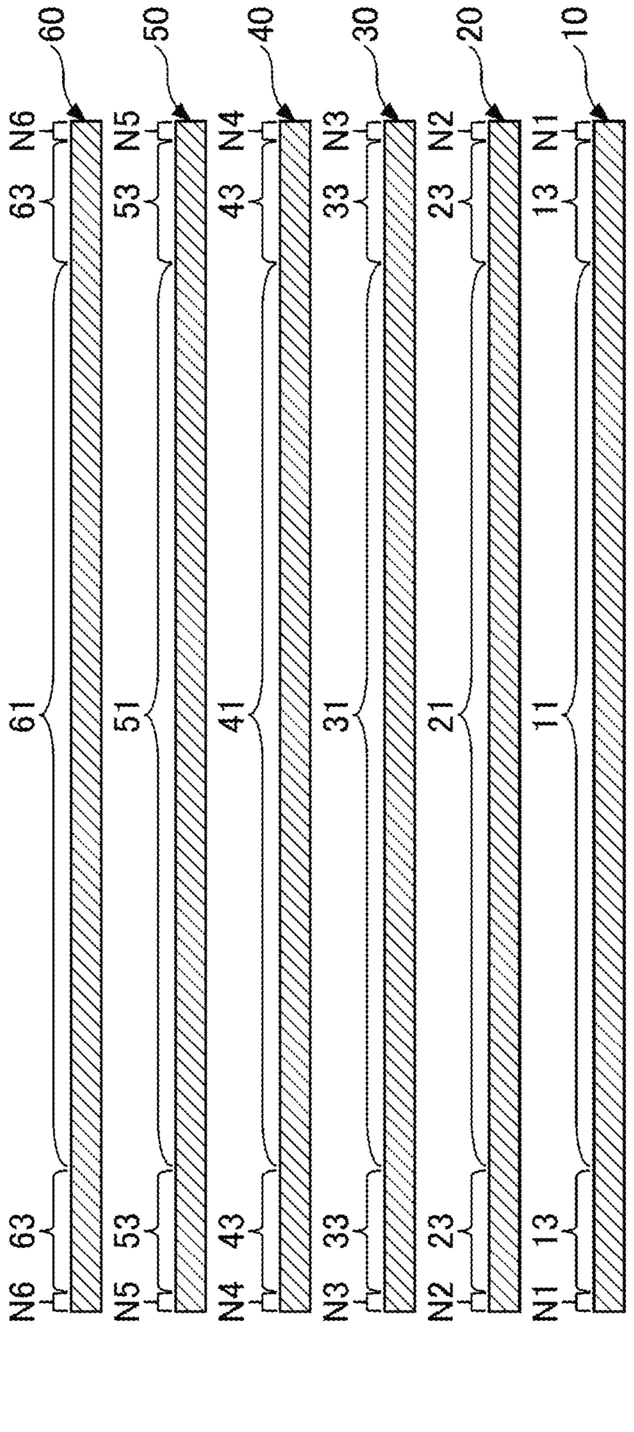
Figure 10:
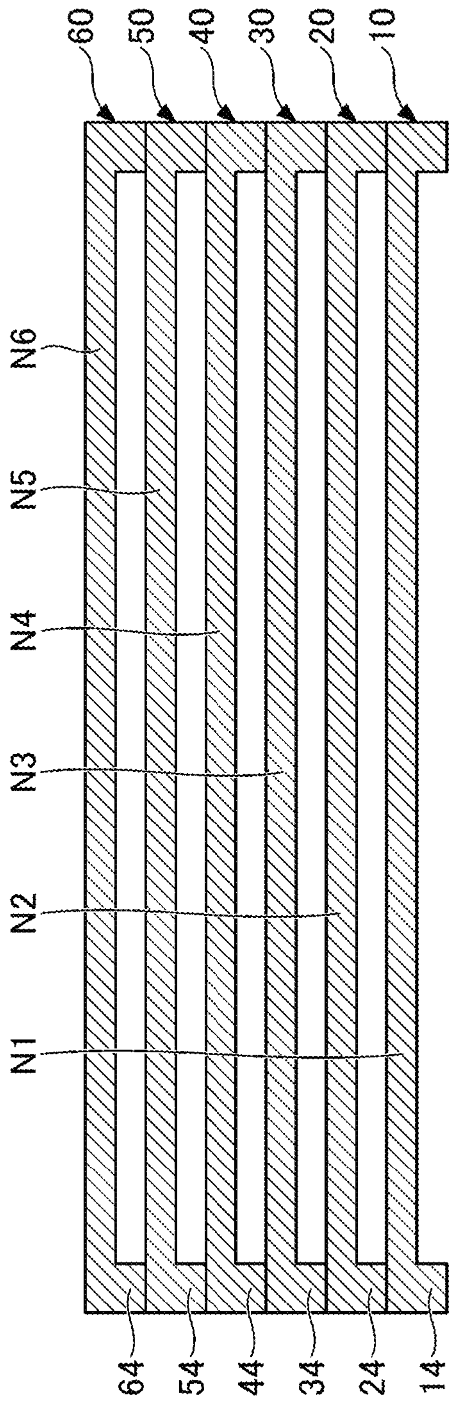
FIG. 10 is a cross sectional view of the coil structure along the line G-G line in FIG. 3A.

FIG. 7A is a cross sectional view of the coil structure 1 along the line A-A in FIG. 3A, and FIG. 7B is a cross sectional view of the coil structure 1 along the line B-B in FIG. 3A. FIG. 8A is a cross sectional view of the coil structure 1 along the line C-C in FIG. 3A, and FIG. 8B is a cross sectional view of the coil structure 1 along the line D-D in FIG. 3A. FIG. 9A is a cross sectional view of the coil structure 1 along the line E-E in FIG. 3A, and FIG. 9B is a cross sectional view of the coil structure 1 along the line F-F in FIG. 3A. FIG. 10 is a cross sectional view of the coil structure 1 along the line G-G in FIG. 3A. In FIG. 7A through FIG. 10, the illustration of some of the reference numerals are omitted for the sake of convenience.

As illustrated in FIG. 7A through FIG. 10, in addition to FIG. 1A through FIG. 6G, the adjacent metal plates of the coil structure 1 are bonded to each other. The adjacent metal plates may be bonded to each other by diffusion bonding, for example. The diffusion bonding is suited for bonding two adjacent metal plates without interposing a material, such as a solder or the like, having a different electrical conductivity or thermal conductivity, and is favorable for bonding the adjacent metal plates from a viewpoint of reducing a voltage loss generated at a junction between the adjacent metal plates.

More particularly, the row 22 of terminals of the second metal plate 20 is laminated on the row 12 of terminals of the first metal plate 10, and the two rows 22 and 12 of terminals are bonded to each other. In other words, the support portion $\mathbf{223}_1$ is laminated on the terminal portion 121, the connecting portion $\mathbf{222}_1$ is laminated on the connecting portion 122, the connecting portion $\mathbf{222}_2$ is laminated on the support portion $\mathbf{123}_1$, the support portion $\mathbf{223}_2$ is laminated on the support portion $\mathbf{123}_2$, the support portion $\mathbf{223}_3$ is laminated on the support portion $\mathbf{123}_3$, the support portion $\mathbf{223}_4$ is laminated on the support portion $\mathbf{123}_4$, and the support portion $\mathbf{223}_5$ is laminated on the support portion $\mathbf{123}_5$. In addition, one reinforcing portion 24 is bonded to each reinforcing portion 14.

Accordingly, the connecting portion 122 connected to the end point 112 of the conductor 11, and the connecting portion $\mathbf{222}_1$ connected to the start point 211 of the conductor 21, are electrically connected, thereby connecting the conductor 11 and the conductor 21 in series. In addition, because the conductors 11 and 21 are made thinner than the rows 12 and 22 of terminals, the upper surface of the conductor 11 and the lower surface of the conductor 21 do not make contact with each other. Moreover, because one of the thick plate portions of the row 12 of terminals is always disposed below each thick plate portion of the row 22 of terminals, the vertically adjacent metal plates, that is, the first and second metal plates 10 and 20, can easily be bonded to each other.

Similarly, the row 32 of terminals of the third metal plate 30 is laminated on the row 22 of terminals of the second metal plate 20, and the two rows 32 and 22 of terminals are bonded to each other. The support portion $\mathbf{323}_1$ is laminated on the support portion $\mathbf{223}_1$, the support portion $\mathbf{323}_2$ is laminated on the connecting portion $\mathbf{222}_1$, the connecting portion $\mathbf{322}_1$ is laminated on the connecting portion $\mathbf{222}_2$, the connecting portion $\mathbf{322}_2$ is laminated on the support portion $\mathbf{223}_2$, the support portion $\mathbf{323}_3$ is laminated on the support portion $\mathbf{223}_3$, the support portion $\mathbf{323}_4$ is laminated on the support portion $\mathbf{223}_4$, and the support portion $\mathbf{323}_5$ is laminated on the support portion $\mathbf{223}_5$. In addition, one reinforcing portion 34 is bonded to each reinforcing portion 24.

Accordingly, the connecting portion $\mathbf{222}_2$ connected to the end point 212 of the conductor 21, and the connecting portion $\mathbf{322}_1$ connected to the start point 311 of the conductor 31, are electrically connected, thereby connecting the conductor 21 and the conductor 31 in series. In addition, because the conductors 21 and 31 are made thinner than the rows 22 and 32 of terminals, the upper surface of the conductor 21 and the lower surface of the conductor 31 do not make contact with each other. Moreover, because one of the thick plate portions of the row 22 of terminals is always disposed below each thick plate portion of the row 32 of terminals, the vertically adjacent metal plates, that is, the second and third metal plates 20 and 30, can easily be bonded to each other.

Similarly, the row 42 of terminals of the fourth metal plate 40 is laminated on the row 32 of terminals of the third metal plate 30, and the two rows 42 and 32 of terminals are bonded to each other. The support portion $\mathbf{423}_1$ is laminated on the support portion $\mathbf{323}_1$, the support portion $\mathbf{423}_2$ is laminated on the support portion $\mathbf{323}_2$, the support portion $\mathbf{423}_3$ is laminated on the connecting portion $\mathbf{322}_1$, the connecting portion $\mathbf{422}_1$ is laminated on the connecting portion $\mathbf{322}_2$, the connecting portion $\mathbf{422}_2$ is laminated on the support portion $\mathbf{323}_3$, the support portion $\mathbf{423}_4$ is laminated on the support portion $\mathbf{323}_4$, and the support portion $\mathbf{423}_5$ is laminated on the support portion $\mathbf{323}_5$. In addition, one reinforcing portion 44 is bonded to each reinforcing portion 34.

Accordingly, the connecting portion $\mathbf{322}_2$ connected to the end point 312 of the conductor 31, and the connecting portion $\mathbf{422}_1$ connected to the start point 411 of the conductor 41, are electrically connected, thereby connecting the conductor 31 and the conductor 41 in series. In addition, because the conductors 31 and 41 are made thinner than the rows 32 and 42 of terminals, the upper surface of the conductor 31 and the lower surface of the conductor 41 do not make contact with each other. Moreover, because one of the thick plate portions of the row 32 of terminals is always disposed below each thick plate portion of the row 42 of terminals, the vertically adjacent metal plates, that is, the third and fourth metal plates 30 and 40, can easily be bonded to each other.

Similarly, the row 52 of terminals of the fifth metal plate 50 is laminated on the row 42 of terminals of the fourth metal plate 40, and the two rows 52 and 42 of terminals are bonded to each other. The support portion $\mathbf{523}_1$ is laminated on the support portion $\mathbf{423}_1$, the support portion $\mathbf{523}_2$ is laminated on the support portion $\mathbf{423}_2$, the support portion $\mathbf{523}_3$ is laminated on the support portion $\mathbf{423}_3$, the support portion $\mathbf{523}_4$ is laminated on the connecting portion $\mathbf{422}_1$, the connecting portion $\mathbf{522}_1$ is laminated on the connecting portion $\mathbf{422}_2$, the connecting portion $\mathbf{522}_2$ is laminated on the support portion $\mathbf{423}_4$, and the support portion $\mathbf{523}_5$ is laminated on the support portion $\mathbf{423}_5$. In addition, one reinforcing portion 54 is bonded to each reinforcing portion 44.

Accordingly, the connecting portion $\mathbf{422}_2$ connected to the end point 412 of the conductor 41, and the connecting portion $\mathbf{522}_1$ connected to the start point 511 of the conductor 51, are electrically connected, thereby connecting the conductor 41 and the conductor 51 in series. In addition, because the conductors 41 and 51 are made thinner than the rows 42 and 52 of terminals, the upper surface of the conductor 41 and the lower surface of the conductor 51 do not make contact with each other. Moreover, because one of the thick plate portions of the row 42 of terminals is always disposed below each thick plate portion of the row 52 of terminals, the vertically adjacent metal plates, that is, the fourth and fifth metal plates 40 and 50, can easily be bonded to each other.

Similarly, the row 62 of terminals of the sixth metal plate 60 is laminated on the row 52 of terminals of the fifth metal plate 50, and the two rows 62 and 52 of terminals are bonded to each other. The support portion $623_1$ is laminated on the support portion $523_1$, the support portion $623_2$ is laminated on the support portion $523_2$, the support portion $623_3$ is laminated on the support portion $523_3$, the support portion $623_4$ is laminated on the support portion $523_4$, the support portion $623_5$ is laminated on the connecting portion $522_1$, the connecting portion 622 is laminated on the connecting portion $522_2$, and the terminal portion 621 is laminated on the support portion $523_5$. In addition, one reinforcing portion 64 is bonded to each reinforcing portion 54.

Accordingly, the connecting portion $522_2$ connected to the end point 512 of the conductor 51, and the connecting portion 622 connected to the start point 611 of the conductor 61, are electrically connected, thereby connecting the conductor 51 and the conductor 61 in series. In addition, because the conductors 51 and 61 are made thinner than the rows 52 and 62 of terminals, the upper surface of the conductor 51 and the lower surface of the conductor 61 do not make contact with each other. Moreover, because one of the thick plate portions of the row 52 of terminals is always disposed below each thick plate portion of the row 62 of terminals, the vertically adjacent metal plates, that is, the fifth and sixth metal plates 50 and 60, can easily be bonded to each other.

According to the configuration of the coil structure 1 described above, the end point 112 of the conductor 11 and the start point 211 of the conductor 21, the end point 212 of the conductor 21 and the start point 311 of the conductor 31, the end point 312 of the conductor 31 and the start point 411 of the conductor 41, the end point 412 of the conductor 41 and the start point 511 of the conductor 51, and the end point 512 of the conductor 51 and the start point 611 of the conductor 61, are successively connected. For this reason, a single spiral coil is formed from the start point 111 of the conductor 11 to the end point 612 of the conductor 61.

FIG. 11A through FIG. 12B are diagrams illustrating examples of manufacturing processes of the coil structure according to the first embodiment. FIG. 11A through FIG. 12B correspond to cross sectional views along the line B-B in FIG. 3A, and illustrate only one product region.

Figure 11A:
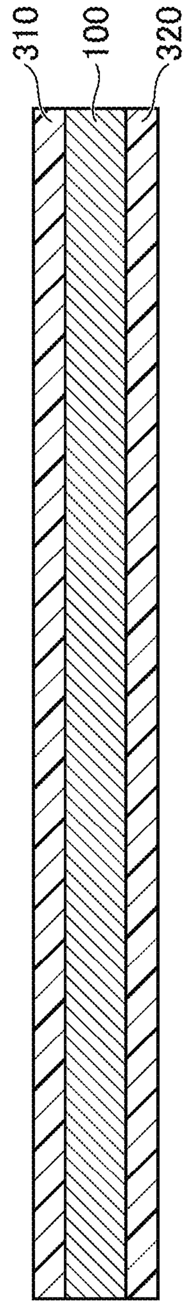
FIG. 11A, FIG. 11B, and FIG. 11C are diagrams illustrating examples of manufacturing processes of the coil structure according to the first embodiment.

First, in the process illustrated in FIG. 11A, a plate-shaped metal 100 having a uniform thickness and a planar shape illustrated in FIG. 1A is prepared. The plate-shaped metal 100 is a member that ultimately becomes the first metal plate 10, and is formed of copper, copper alloys, 42-alloys such as Fe—Ni alloys or the like, or the like, for example. The thickness of the plate-shaped metal 100 may be in a range of approximately 50 μm to approximately 500 μm, for example. A plurality of product regions are defined on the plate-shaped metal 100. A resist layer 310 is formed on the entire upper surface of the plate-shaped metal 100, and a resist layer 320 is formed on the entire lower surface of the plate-shaped metal 100. The resist layers 310 and 320 may be formed by laminating a photosensitive dry film resist, for example.

Figure 11B:
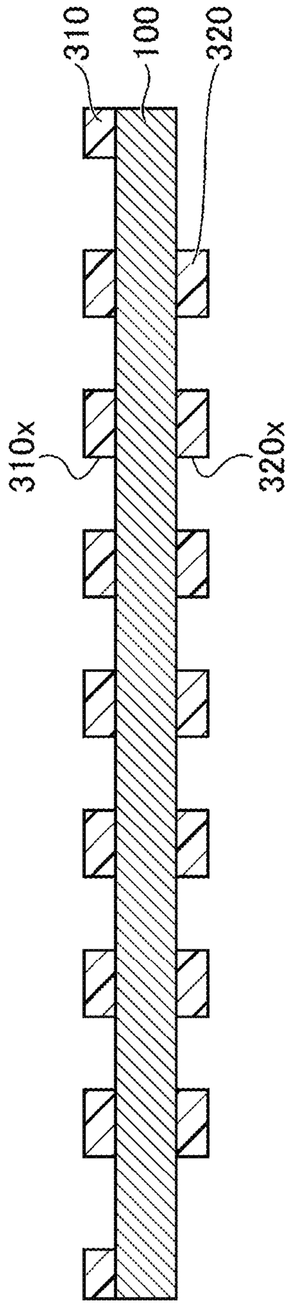

Next, in the process illustrated in FIG. 11B, the resist layer 310 is exposed and developed, to form openings 310*x* selectively exposing the upper surface of the plate-shaped metal 100. In addition, the resist layer 320 is exposed and developed, to form openings 320*x* selectively exposing the lower surface of the plate-shaped metal 100.

Figure 11C:
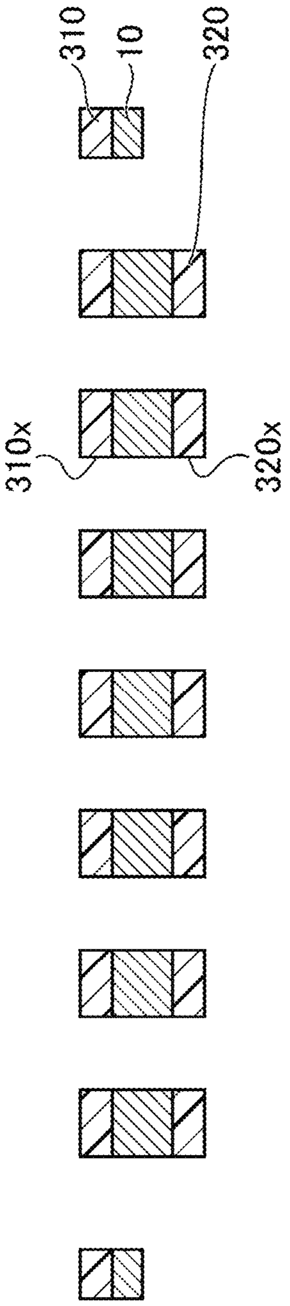

Next, in the process illustrated in FIG. 11C, the plate-shaped metal 100 exposed inside the openings 310*x* is half-etched from the upper surface of the plate-shaped metal 100, and the plate-shaped metal 100 exposed inside the openings 320*x* is half-etched from the lower surface of the plate-shaped metal 100. As a result, the plate-shaped metal 100 is patterned, thereby forming the first metal plate 10 having the conductor 11, the row 12 of terminals, or the like.

In the plate-shaped metal 100, a region where the resist layers 310 and 320 overlap in the plan view, maintains the original thickness because this region is not etched, thereby forming the thick plate portion. Moreover, a region where both the resist layers 310 and 320 are not formed in the plan view, are half-etched from both the upper and lower surfaces of the plate-shaped metal 100, thereby forming a through hole. In addition, a region where only the resist layer 310 is formed in the plan view is half-etched only from the lower surface of the plate-shaped metal 100, thereby forming the thin plate portion having a thickness which is approximately one-half the original thickness. In a case where the plate-shaped metal 100 is copper, a ferric chloride solution, for example, may be used for the half-etching.

Figure 12A:
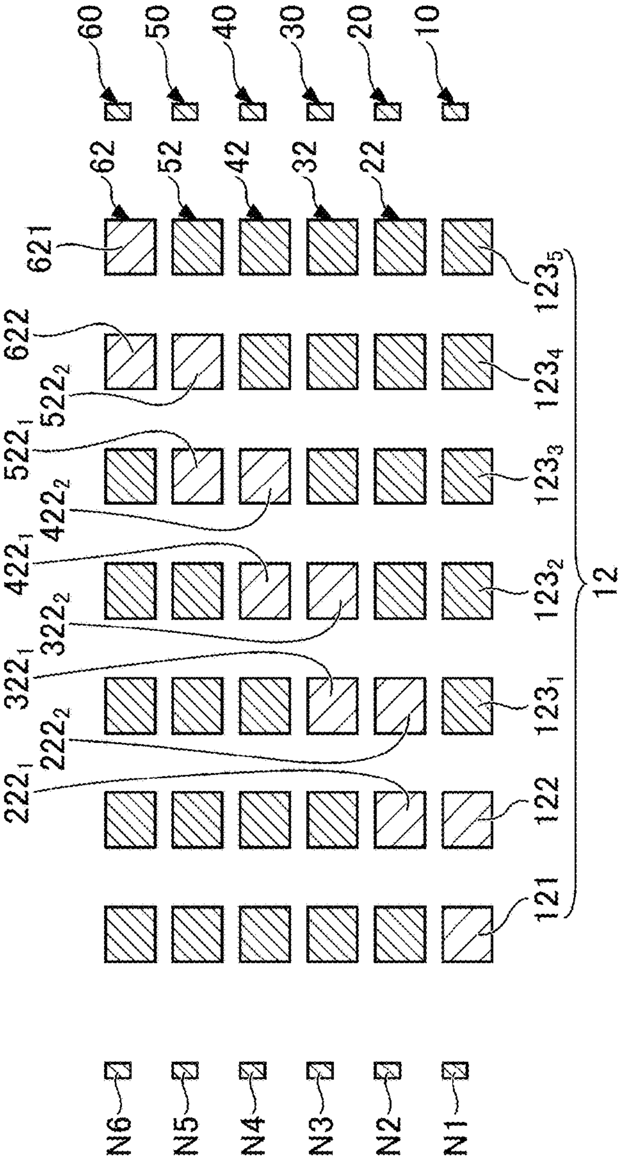
FIG. 12A and FIG. 12B are diagrams illustrating examples of the manufacturing processes of the coil structure according to the first embodiment.

Next, in the process illustrated in FIG. 12A, the second metal plate 20, the third metal plate 30, the fourth metal plate 40, the fifth metal plate 50, and the sixth metal plate 60 are manufactured in the same manner as in FIG. 11A through FIG. 11C. The planar shapes of the metal plates are as illustrated in FIG. 3B through FIG. 5B, and the cross sectional shapes of the metal plates are as illustrated in FIG. 6A through FIG. 10.

Figure 12B:
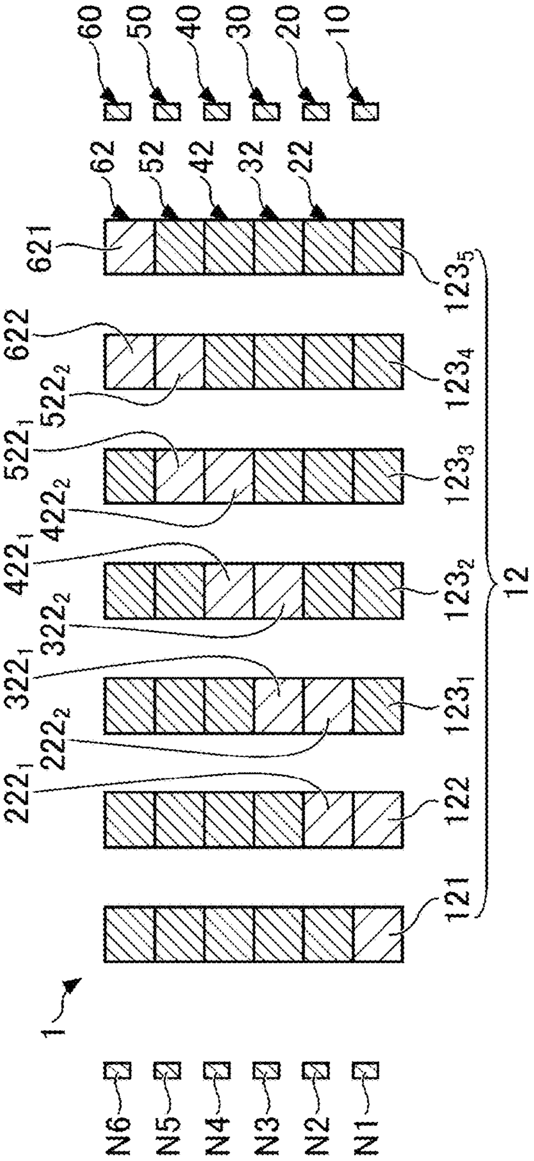

Next, in the process illustrated in FIG. 12B, the metal plates are laminated, and the thick plate portions of the adjacent metal plates, including the rows of terminals, are bonded to each other. More particularly, the metal plates are laminated in the order illustrated in FIG. 12B, to form a laminate, and the laminate is pressed in a vertical direction in a vacuum atmosphere and heated to perform the diffusion bonding. As a result, the thick plate portions of the adjacent metal plates are directly bonded to each other, thereby completing the coil structure 1. When the diffusion bonding is performed, one of the thick plate portions of the row of terminals of the lower layer is always disposed below each thick plate portion of the row of terminals except the lowermost layer. For this reason, the bonding of each of the thick plate portions can be performed in one bonding operation. The metal plates are preferably made of the same material, so that excellent bonding of the adjacent metal plates can be achieved by the diffusion bonding.

The coil structure 1 can be completed by the processes described above. However, an inductor 2 can be manufactured by continuing to perform the processes illustrated in FIG. 13A and FIG. 13B.

Figure 13A:
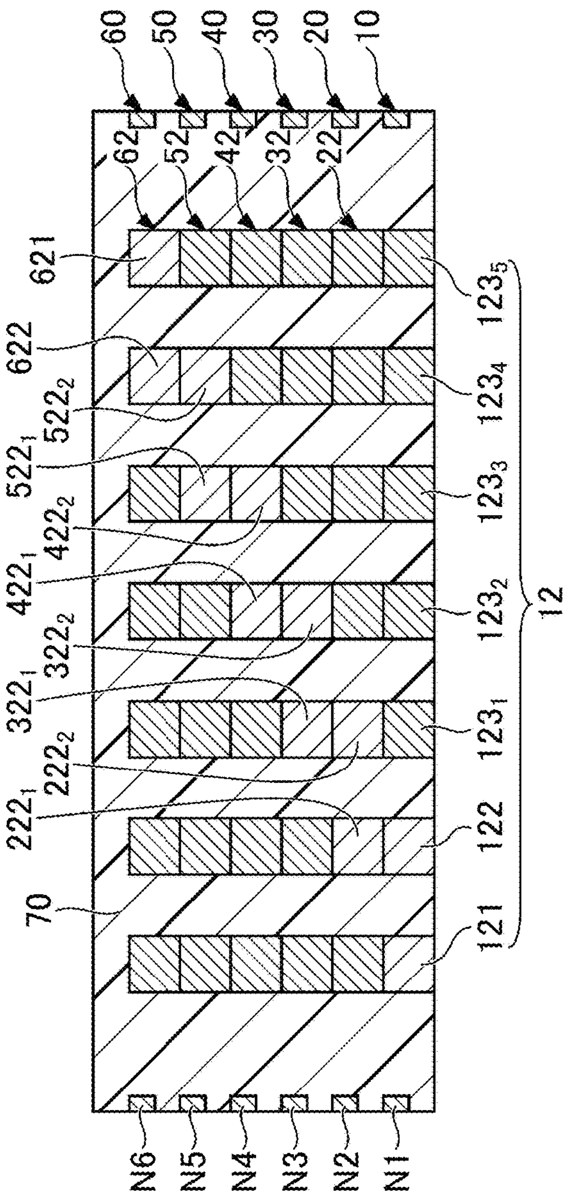
FIG. 13A and FIG. 13B are diagrams illustrating examples of manufacturing processes of an inductor according to the first embodiment.

In the process illustrated in FIG. 13A, an encapsulating resin 70 is formed on the coil structure 1 illustrated in FIG. 12B. An insulating resin used for the encapsulating resin 70 may be a thermosetting resin or a thermoplastic resin, such as epoxy-based resins, polyimide-based resins, phenolic-based resins, acrylic-based resins, or the like, for example. The encapsulating resin 70 is formed so that the lower surface of the row 12 of terminals of the first metal plate 10 is exposed from a lower surface of the encapsulating resin 70. After the encapsulating resin 70 is formed, the lower surface of the encapsulating resin 70 is preferably subjected to a polishing or blast process to remove resin burrs on the lower surface of the row 12 of terminals. A low-pressure molding, such as a transfer molding, a compression molding, or the like, for example, may be used to form the encapsulating resin 70.

Figure 13B:
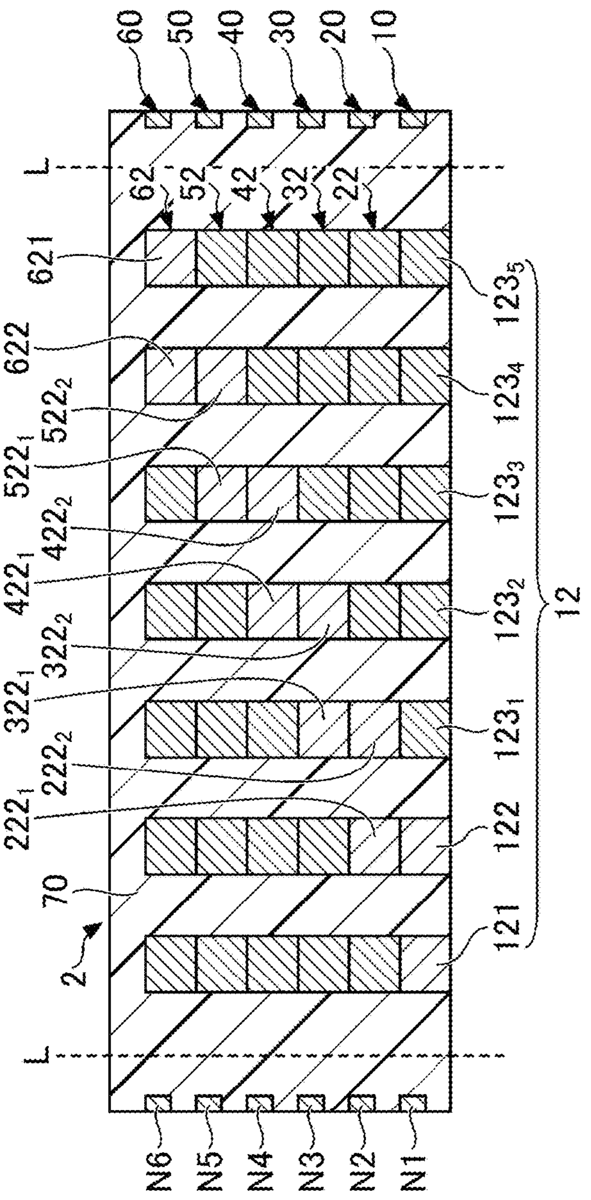
Figure 14A:
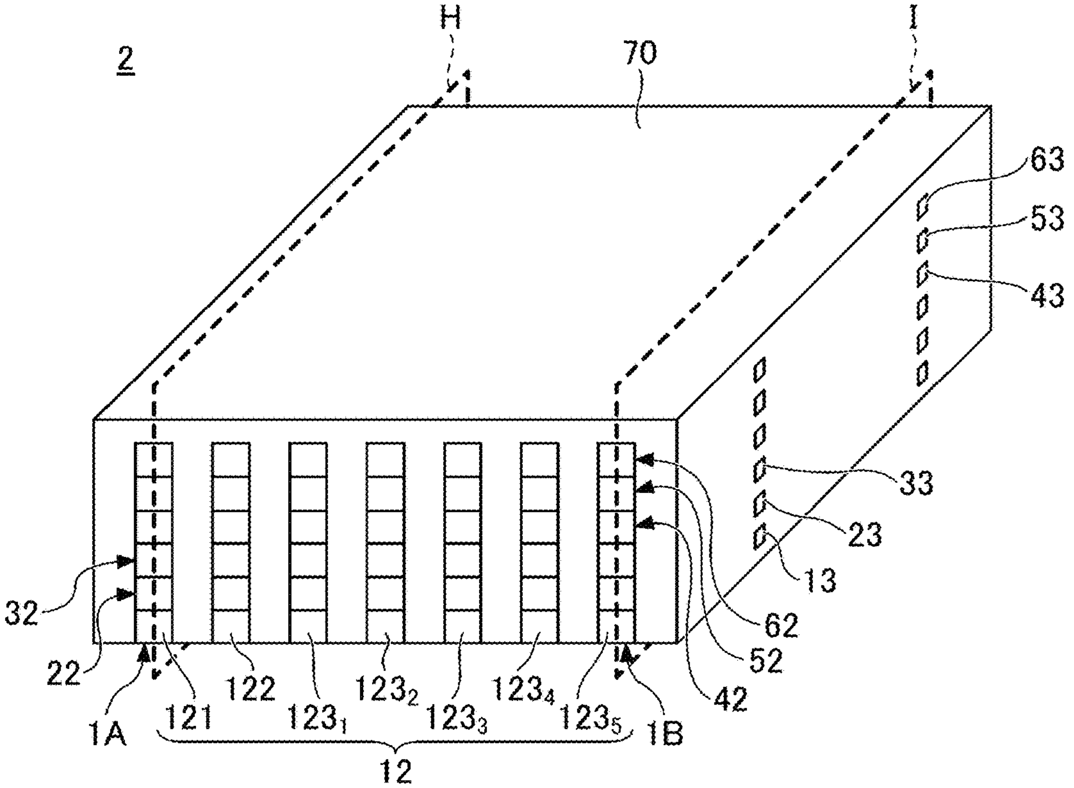
FIG. 14A and FIG. 14B are perspective views illustrating an example of the inductor according to the first embodiment.
Figure 14B:
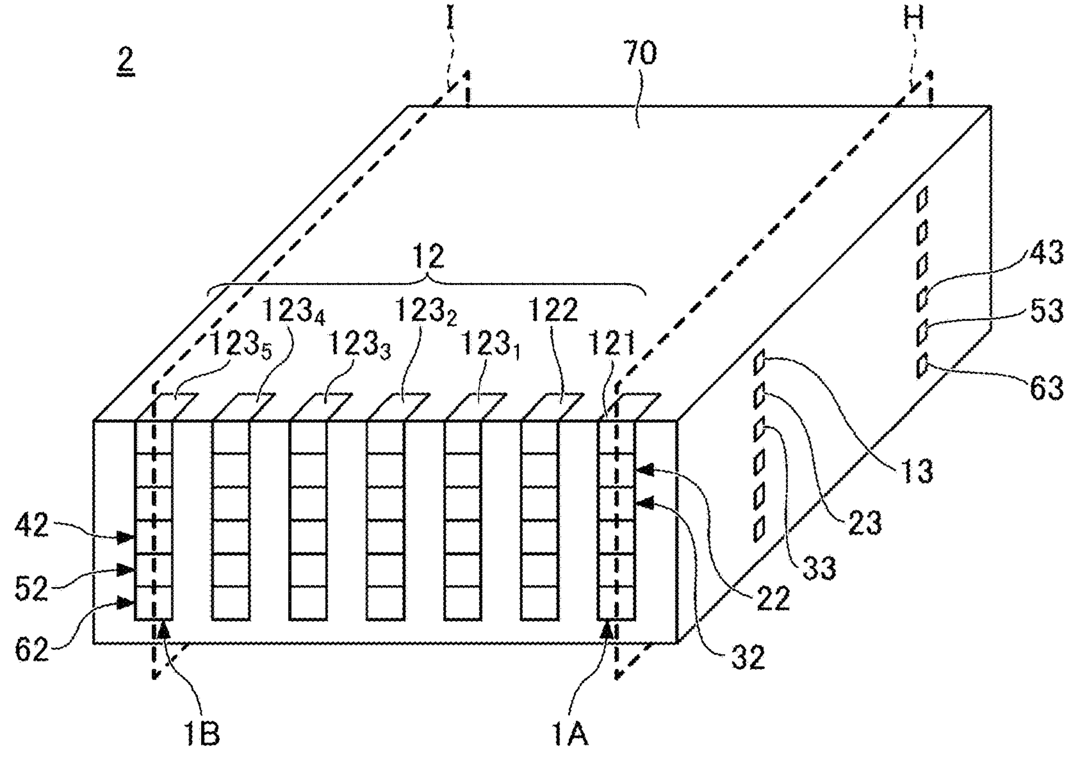

Next, in the process illustrated in FIG. 13B, the structure illustrated in FIG. 13A is cut at positions of cutting-plane lines L using a dicing blade or the like, and singulated to form the inductor 2. The structure illustrated in FIG. 13A may be singulated by pressing or etching. The cutting-plane lines L are located at positions corresponding to broken lines indicating the product region M in FIG. 1B. The cutting exposes side surfaces of the rows 12, 22, 32, 42, 52, and 62 of terminals from one side surface of the encapsulating resin 70. From each product region M, the surface-mount type inductor 2 illustrated in FIG. 14A and FIG. 14B is formed. The planar shape of the inductor 2 may be an approximately rectangular shape, such as a square shape, a oblong shape, or the like, for example.

The side surface and the lower surface of the terminal portion 121 of the row 12 of terminals, the side surface of the support portion $\mathbf{223_1}$ of the row 22 of terminals, the side surface of the support portion $\mathbf{323_1}$ of the row 32 of terminals, the side surface of the support portion $\mathbf{423_1}$ of the row 42 of terminals, the side surface of the support portion $\mathbf{523_1}$ of the row 52 of terminals, and the side surface of the support portion $\mathbf{623_1}$ of the row 62 of terminals, exposed from the encapsulating resin 70, respectively form an external connection terminal 1A. In addition, the side surface and the lower surface of the support portion $\mathbf{123_5}$ of the row 12 of terminals, the side surface of the support portion $\mathbf{223_5}$ of the row 22 of terminals, the side surface of the support portion $\mathbf{323_5}$ of the row 32 of terminals, the side surface of the support portion $\mathbf{423_5}$ of the row 42 of terminals, the side surface of the support portion $\mathbf{523_5}$ of the row 52 of terminals, and the side surface of the terminal portion 621 of the row 62 of terminals, exposed from the encapsulating resin 70, respectively form an external connection terminal 1B.

FIG. 14B is a view of FIG. 14A viewed from the lower surface thereof. In other words, FIG. 14B is a diagram corresponding to FIG. 14A which is rotated 180 degrees in a left-to-right (or clockwise) direction on paper, that is, turned upside down. For example, the planar shape of the inductor 2 may be an approximately rectangular shape having a size of approximately 3 mm×3 mm. The thickness of the inductor 2 may be approximately 1.0 mm, for example.

Figure 15A:
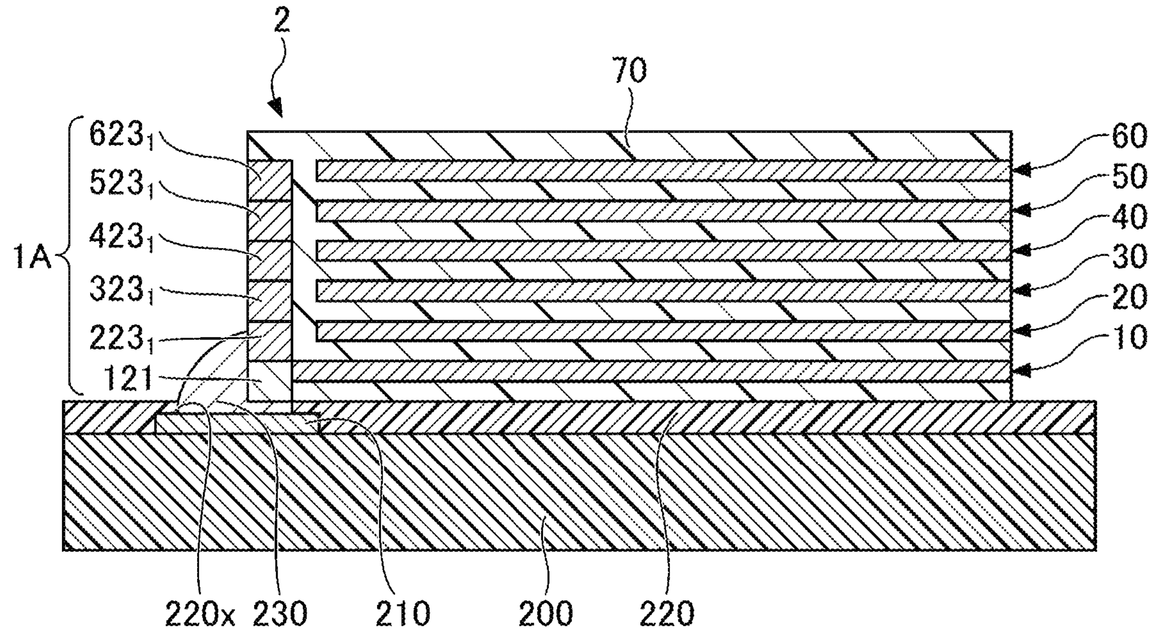
FIG. 15A and FIG. 15B are cross sectional views for explaining a method for mounting the inductor according to the first embodiment.
Figure 15B:
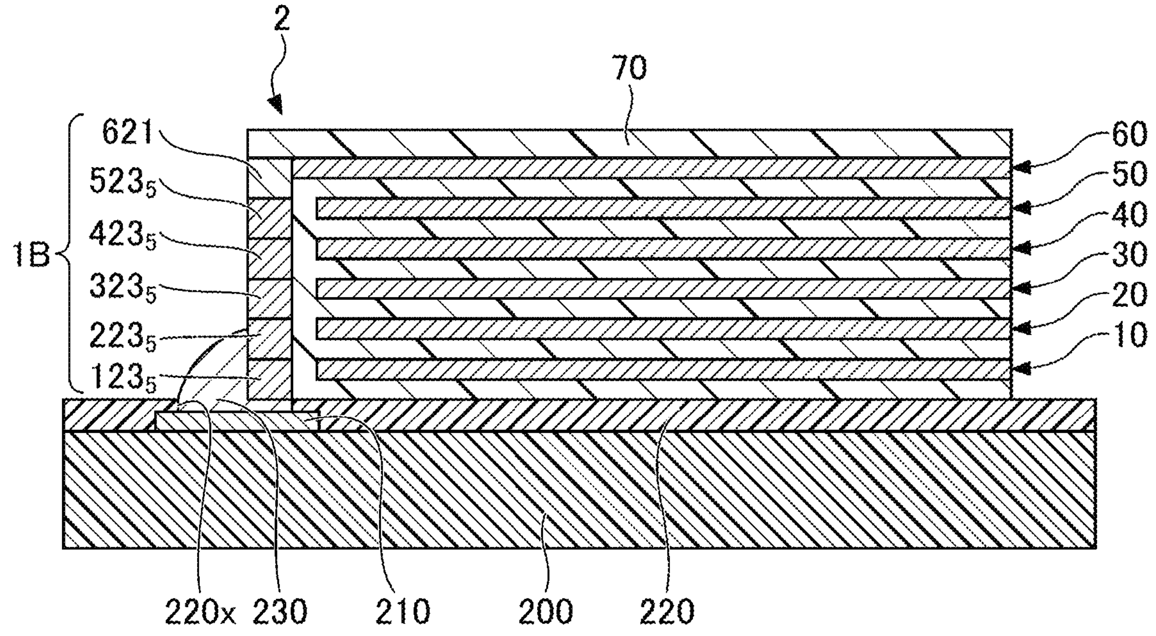

FIG. 15A and FIG. 15B are cross sectional views for explaining a method for mounting the inductor according to the first embodiment. FIG. 15A illustrates a cross section along a cutting-plane line H in FIG. 14A and FIG. 14B, and FIG. 15B illustrates a cross section along a cutting-plane line I in FIG. 14A and FIG. 14B. In FIG. 15A and FIG. 15B, the inductor 2 is mounted on a substrate 200. More particularly, a pad 210 is formed on an upper surface of the substrate 200, and a portion of an upper surface of the pad 210 is exposed inside an opening 220*x* of a solder resist layer 220. The upper surface of the pad 210 exposed inside the opening 220*x* is electrically connected to the external connection terminals 1A and 1B of the inductor 2, via a solder 230.

As described above, the coil structure 1 has the configuration in which the six metal plates are laminated. Each metal plate includes a conductor formed in a spiral shape, and a row of terminals aligned in a predetermined direction on an outer side the spiral shape formed by the conductor, where the row of terminals includes seven thick plate portions having the same thickness which is thicker than the conductor. Six such metal plates are laminated, and the terminals of the adjacent metal plates are bonded to each other. In addition, both ends of the conductor of each metal plate are connected to two adjacent thick plate portions, among the thick plate portions forming the row of terminals of each metal plate.

Both ends of the conductor 11 of the lowermost metal plate are connected to the terminal portion 121 and the connecting portion 122, which are two thick plate portions located on a first end (left side in the example illustrated in FIG. 3A or the like) of the row 12 of terminals, and the positions of the thick plate portions connected to both ends of the conductor are shifted one place toward a second end (right side) of the row of terminals, opposite to the first end, for each upward increase in level within the laminate along a laminated direction (direction toward an uppermost metal plate in this example) of the metal plates. According to this configuration, the conductors of the metal plates are connected in series to form a single spiral coil.

According to the configuration described above, it is easy to increase the number of turns of the coil by increasing the number of metal plates that are laminated. As a result, by using the coil structure 1, it is possible to form the inductor 2 which has a small size but can obtain a large induced electromotive force. In other words, by encapsulating the coil structure 1 by the encapsulating resin 70 so as to expose the external connection terminals 1A and 1B, it is possible to form the inductor 2 which is small but can obtain the large induced electromotive force.

The number of metal plates that are laminated is not limited to six, and may be n, where n is a natural number greater than or equal to two. In this case, each metal plate may include the conductor having the spiral shape, and the row of terminals aligned in the predetermined direction on the outer side the spiral shape formed by the conductor, where the row of terminals includes n+1 thick plate portions having the same thickness which is thicker than the conductor. Alternatively, the number of thick plate portions forming the row of terminals may be greater than or equal to n+1. For example, when using a common metal plate and varying the number of metal plates that are laminated depending on the application, the number of thick plate portions forming the row of terminals may be greater than or equal to n+1.

For example, if n metal plates were laminated, and the number of thick plate portions forming the row of terminals were less than or equal to n, the support from the lower end would become insufficient when the metal plates are bonded by applying heat and pressure in the vertical direction, thereby causing some thick plate portions to assume a floating state. Such a floating state of the thick plate portions would make the bonding difficult.

On the other hand, according to the coil structure 1, each of the n metal plates includes the conductor having the spiral shape, and the row of terminals, aligned in the predetermined direction on the outer side the spiral shape formed by the conductor, includes n+1 thick plate portions. For this reason, the metal plates can be easily bonded together by the diffusion bonding or the like.

Moreover, in the coil structure 1, the six thick plate portions laminated at one end of the row of terminals become the external connection terminal 1A, and the six thick plate portions laminated at the other end of the row of terminals become the external connection terminal 1B. In other words, the support portions $\mathbf{223_1}$, $\mathbf{323_1}$, $\mathbf{423_1}$, $\mathbf{523_1}$, and $\mathbf{623_1}$ are successively laminated on the terminal portion 121, thereby forming the external connection terminal 1A. Further, the support portions $\mathbf{223_5}$, $\mathbf{323_5}$, $\mathbf{423_5}$, and $\mathbf{523_5}$, and the terminal portion 621 are successively laminated on the support portion $\mathbf{123_5}$, thereby forming the external connection terminal 1B.

Because one end of the row of terminals of each of the metal plates is laminated on the terminal portion 121 of the first metal plate 10 in the external connection terminal 1A, an external connection to an external device or the like can be made by an arbitrary metal plate of the external connection terminal 1A. Similarly, because the other end of the row of terminals of each of the metal plates is laminated on the support portion $\mathbf{123}_5$ of the first metal plate 10 in the external connection terminal 1B, the external connection to the external device or the like can be made by an arbitrary metal plate of the external connection terminal 1B.

In the example described above, the side of the conductor 11 is regarded as the start point, and the side of the conductor 61 is regarded as the end point, for the sake of convenience. However, because the coil structure 1 is non-polar, the current may flow from the external connection terminal 1A toward the external connection terminal 1B, or may flow from the external connection terminal 1B toward the external connection terminal 1A.

The coil structure 1 may be shipped as a product, or the inductor 2 may be shipped as a product. In addition, any one or more of the first metal plate 10, the second metal plate 20, the third metal plate 30, the fourth metal plate 40, the fifth metal plate 50, and the sixth metal plate 60 before the lamination may be shipped as a lead frame. In other words, in the lead frame that is shipped, the metal plate may include the conductor formed in the spiral shape, and the row of terminals aligned in the predetermined direction on the outer side the spiral shape formed by the conductor, where the row of terminals includes three or more thick plate portions having the same thickness which is thicker than the conductor, and both ends of the conductor of the metal plate are connected to two adjacent thick plate portions among the thick plate portions forming the row of terminals of the metal plate.

Second Embodiment

A second embodiment illustrates an example in which the conductor or the like is covered by an insulating film. In the second embodiment, those parts that are the same as those corresponding parts of the first embodiment are designated by the same reference numerals, and a description thereof may be omitted.

Figure 16:
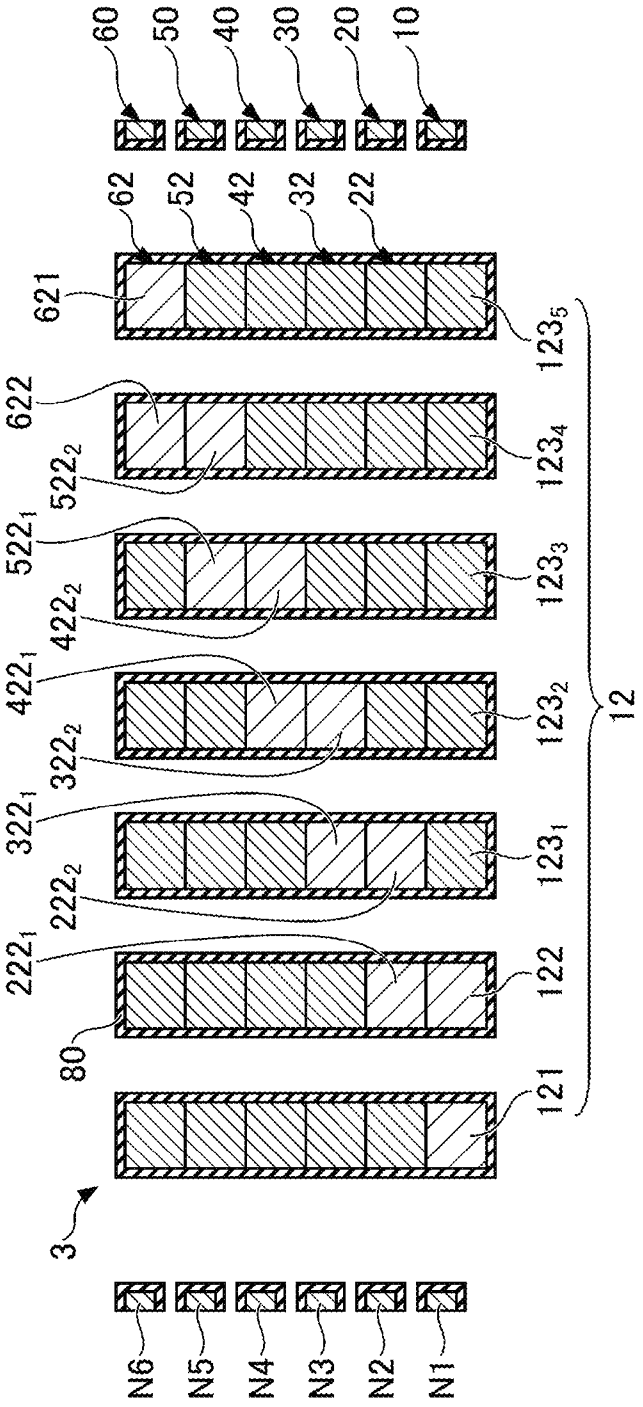
FIG. 16 is a cross sectional view illustrating an example of the coil structure according to a second embodiment.

FIG. 16 is a cross sectional view illustrating the coil structure according to the second embodiment, and illustrates a cross section corresponding to FIG. 7B. As illustrated in FIG. 16, a coil structure 3 differs from the coil structure 1 (refer to FIG. 7B or the like) in that the coil structure 3 includes an insulating film 80 which covers the surface of each metal plate.

More particularly, the insulating film 80 is formed on the surfaces of each of the conductor 11, the connections 13, and the frame N1 of the first metal plate 10; the conductor 21, the connections 23, and the frame N2 of the second metal plate 20; the conductor 31, the connections 33, and the frame N3 of the third metal plate 30; the conductor 41, the connections 43, and the frame N4 of the fourth metal plate 40; the conductor 51, the connections 53, and the frame N5 of the fifth metal plate 50; and the conductor 61, the connections 63, and the frame N6 of the sixth metal plate 60. In addition, the insulating film 80 is formed on the surfaces of the laminated structure in which each portion (terminal portion, connecting portion, and support portion) of the rows 12, 22, 32, 42, 52, and 62 of terminals is laminated.

A material used for the insulating film 80 may be an insulating resin, such as epoxy-based resins, polyimide-based resins, or the like, for example. A thickness of the insulating film 80 may be approximately 10 μm, for example. The insulating film 80 may be formed by electrodeposition, for example. When the insulating film 80 is formed by the electrodeposition, an insulating film having an approximately uniform thickness can be formed on the surfaces of each of the metal plates.

Figure 17:
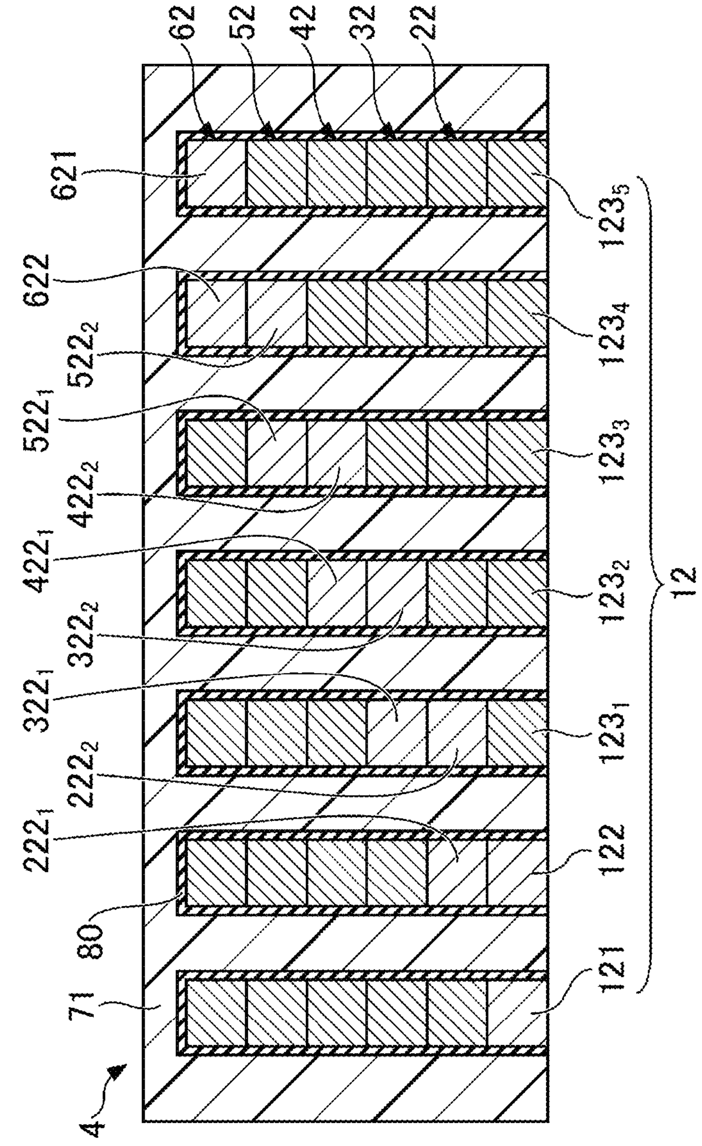
FIG. 17 is a cross sectional view illustrating the example of the inductor according to the second embodiment.

FIG. 17 is a cross sectional view illustrating an example of the inductor according to the second embodiment. As illustrated in FIG. 17, an inductor 4 can be formed by encapsulating the coil structure 3 illustrated in FIG. 16 with an encapsulating resin 71, and cutting encapsulated coil structure 3 at predetermined positions. The planar shape of the inductor 4 may be a rectangular shape, such as a square shape, an oblong shape, of the like, for example. An insulating resin used for the encapsulating resin 71 may include a magnetic filler, for example.

Soft magnetic powder, for example, may be used for the magnetic filler. Examples of the soft magnetic powder include iron-based amorphous alloy powder, carbonyl iron powder, ferrite or permalloy powder, or the like. Examples of the insulating resin include thermosetting resins or thermoplastic resins, such as epoxy-based resins, polyimide-based resins, phenolic-based resins, acrylic-based resins, or the like. A blending or mixing ratio of the magnetic filler material and the insulating resin may be adjusted so as to secure the required permeability and moldability.

Figure 18A:
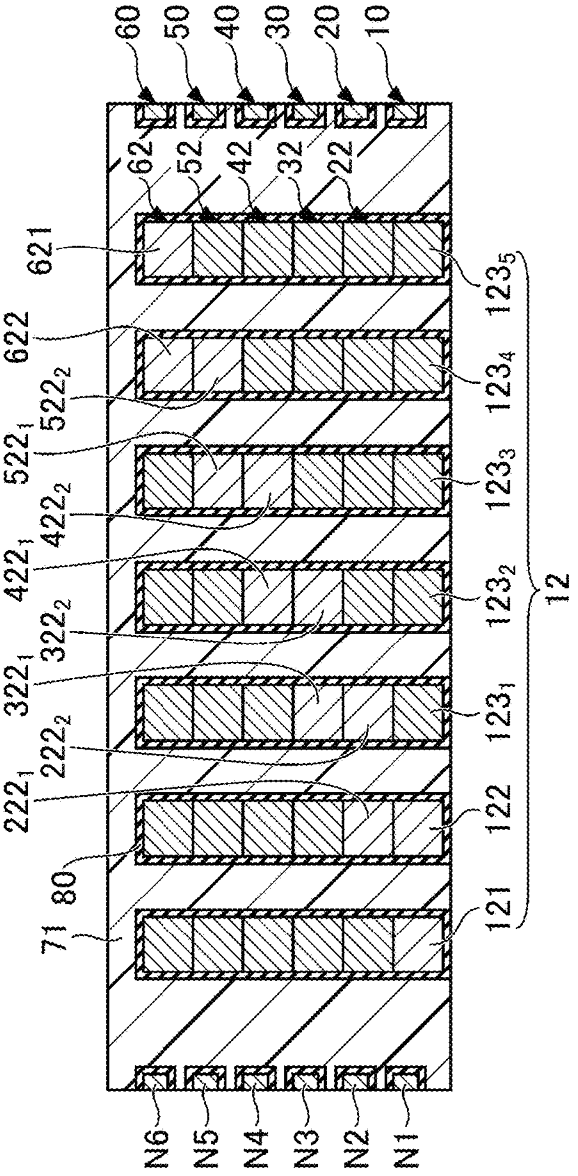
FIG. 18A and FIG. 18B are diagrams illustrating examples of manufacturing processes of the coil structure according to the second embodiment.
Figure 18B:
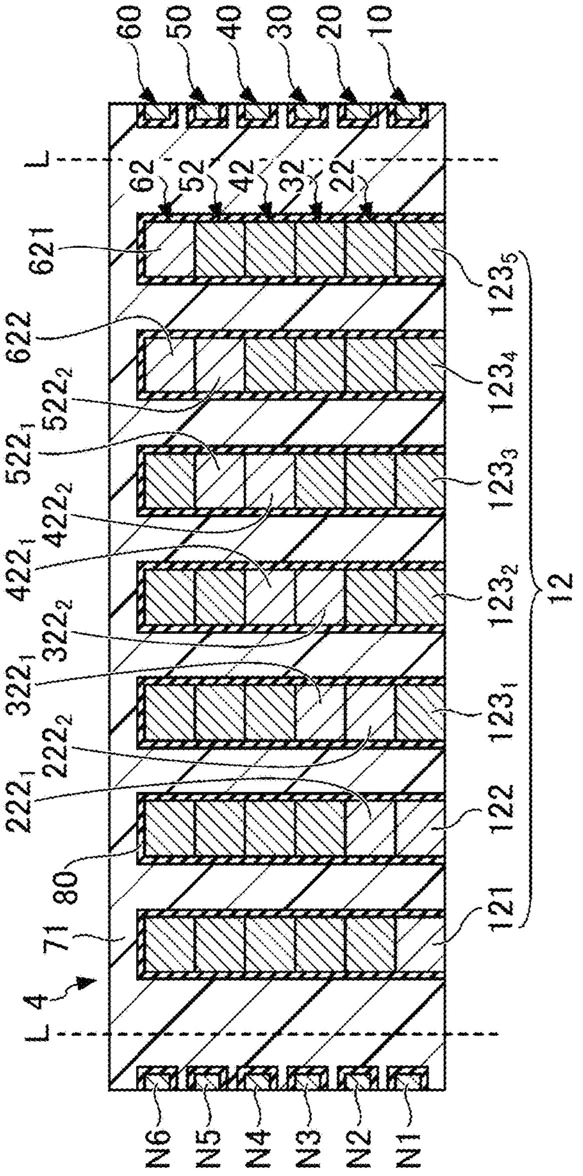
Figure 19A:
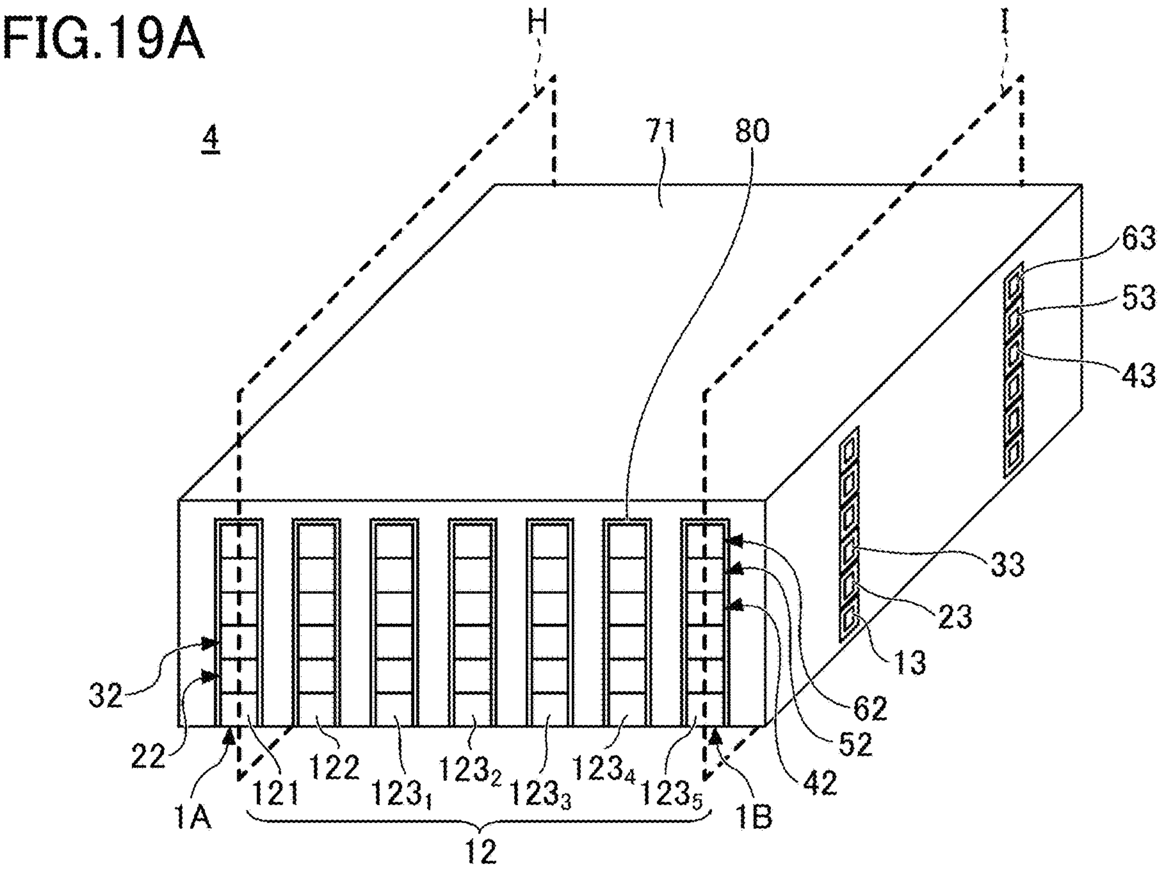
FIG. 19A and FIG. 19B are perspective views illustrating the example of the inductor according to the second embodiment.
Figure 19B:
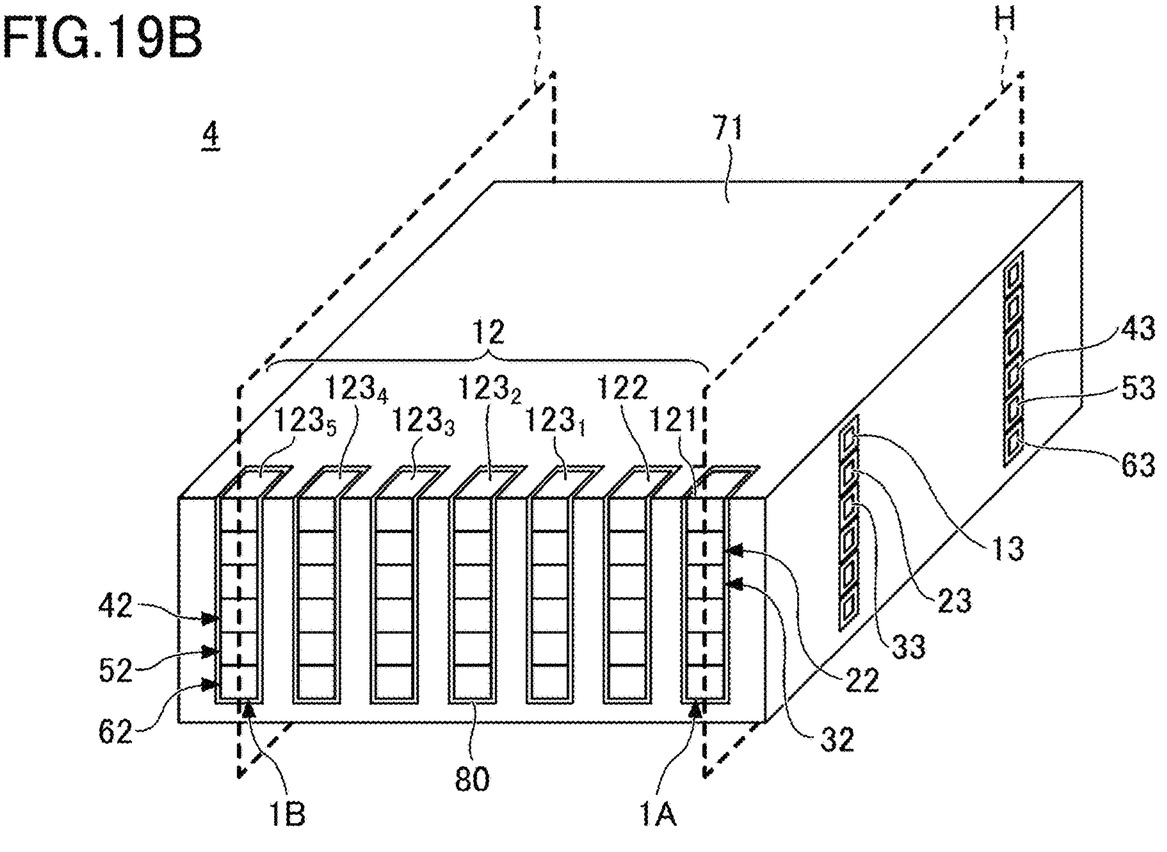

In order to form the inductor 4, the insulating film 80 is formed on the surfaces of each of the metal plates of the structure by the electrodeposition or the like, as illustrated in FIG. 12B, and the encapsulating resin 71 is formed thereafter by the low-pressure molding, such as the transfer molding or the compression molding, as illustrated in FIG. 18A, for example. Then, as illustrated in FIG. 18B, the insulating film 80 covering the lower surface of the structure illustrated in FIG. 18A is removed by the polishing or blasting, thereby exposing the lower surface of the row 12 of terminals from the encapsulating resin 71. Thereafter, the structure illustrated in FIG. 18B is cut at the positions of the cutting-plane lines L using the dicing blade or the like, and singulated to form the inductor 4. From each product region M, the surface-mount type inductor 4 illustrated in FIG. 19A and FIG. 19B is formed. FIG. 19B is a view of FIG. 19A viewed from the lower surface thereof. In other words, FIG. 19B is a diagram corresponding to FIG. 19A which is rotated 180 degrees in a left-to-right (or clockwise) direction on paper, that is, turned upside down. For example, the planar shape of the inductor 4 may be an approximately rectangular shape having a size of approximately 3 mm×3 mm. The thickness of the inductor 4 may be approximately 1.0 mm, for example.

Figure 20A:
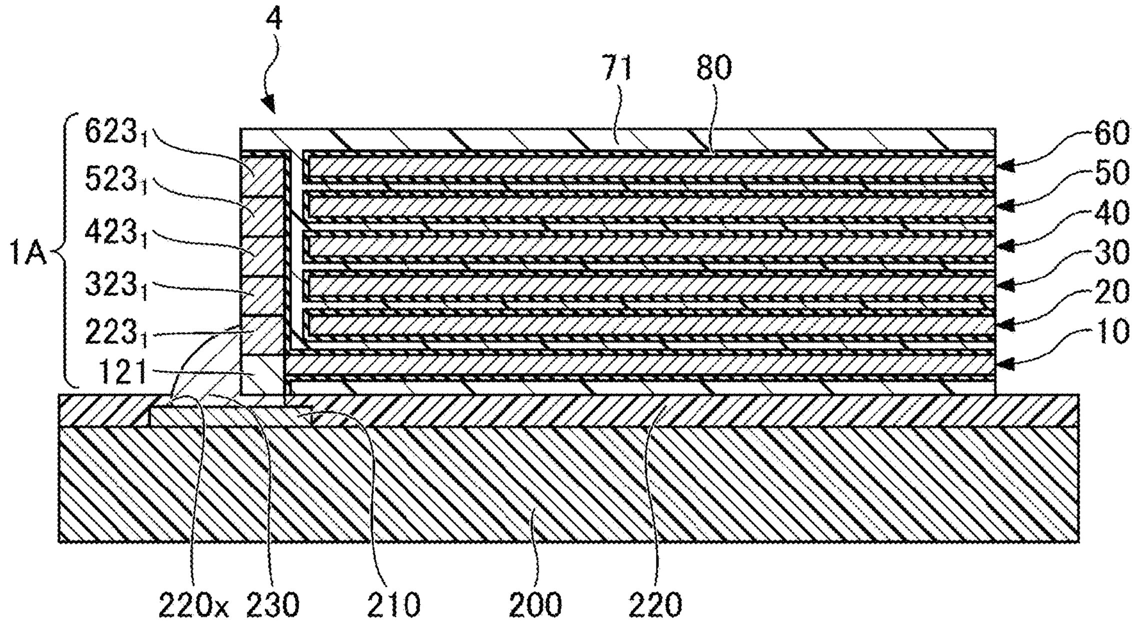
FIG. 20A and FIG. 20B are cross sectional views for explaining a method for mounting the inductor according to the second embodiment.
Figure 20B:
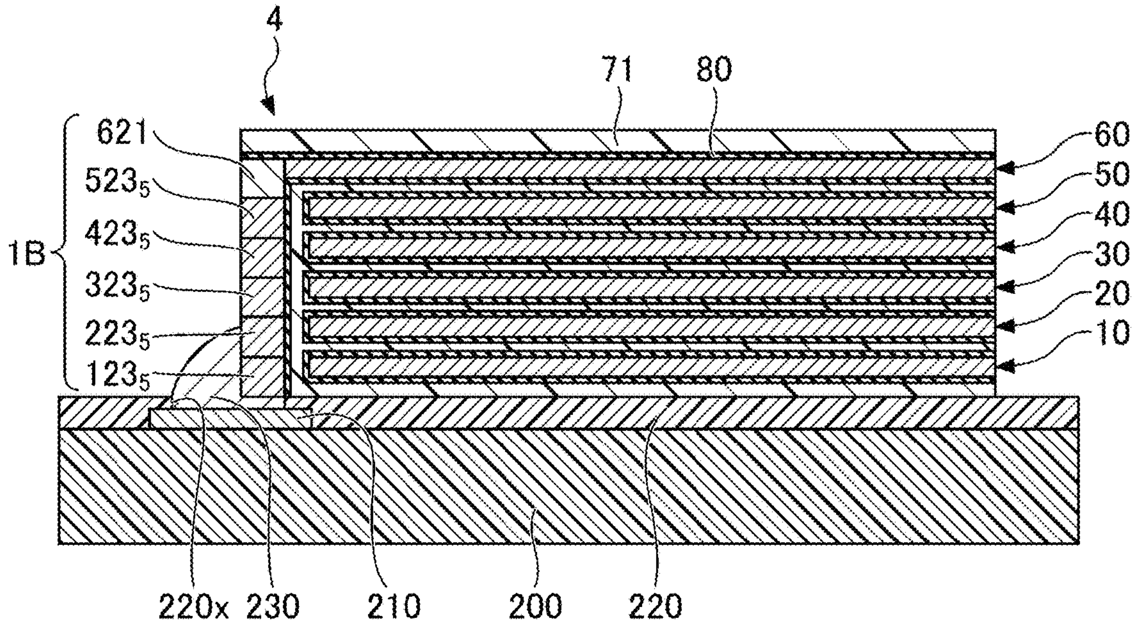

FIG. 20A and FIG. 20B are cross sectional views for explaining the method for mounting the inductor according to the second embodiment. FIG. 20A illustrates a cross section along the cutting-plane line H in FIG. 19A and FIG. 19B, and FIG. 20B illustrates a cross section along the cutting-plane line I in FIG. 19A and FIG. 19B. In FIG. 20A and FIG. 20B, the inductor 4 is mounted on the substrate 200. More particularly, the pad 210 is formed on the upper surface of the substrate 200, and a portion of the upper surface of the pad 210 is exposed inside the opening 220*x* of the solder resist layer 220. The upper surface of the pad 210 exposed inside the opening 220*x* is electrically connected to the external connection terminals 1A and 1B of the inductor 4, via the solder 230.

As described above, because the coil structure 3 of the inductor 4 is encapsulated with the encapsulating resin 71 made of the insulating resin including the magnetic filler, it is possible to improve the inductance of the inductor 4. Further, because the surfaces of each of the metal plates are covered by the insulating film 80, it is possible to prevent the adjacent metal plates from becoming electrically connected to each other via the filler.

Although the preferred embodiments are described above in detail, various variations, modifications, and substitutions may be made in each of the embodiments, without departing from the scope of the present disclosure.

For example, the planar shapes of the conductor and the frame of each of the metal plates are not limited to the generally rectangular shapes, and may have a circular shape, an elliptical shape, or the like, including other and more complex shapes.

According to the disclosed technique, it is possible to provide a coil structure having a configuration which can easily increase the number of turns.

Various aspects of the subject-matter described herein may be set out non-exhaustively in the following numbered clauses:

1. A method for manufacturing a coil structure including n metal plates that are laminated, where n is a natural number greater than or equal to two, the method comprising:
forming each of the n metal plates respectively including a spiral conductor, and a row of terminals, aligned in a predetermined direction on an outer side of the conductor, and formed by n+1 or more plate portions thicker than the conductor, by patterning a plate-shaped metal; and
bonding the rows of terminals of adjacent metal plates by laminating each of the n metal plates,
wherein the forming includes connecting two ends of the conductor to two adjacent plate portions for each of the n metal plates, and
wherein the bonding includes connecting the two ends of the conductor of a lowermost metal plate among the n metal plates to the two adjacent plate portions located at a first end of the lowermost metal plate, connecting the two ends of the conductor of a second lowest metal plate among the n metal plates to the two adjacent plate portions located at a position shifted one place toward a second end opposite to the first end of the second lowest metal plate, so that the position where the two ends of the conductor connect to the two adjacent plate portions shifts one place toward the second end for each upward increase in level within a laminate along a laminated direction of the n metal plates, thereby connecting the conductors of each of the n metal plates in series to form a spiral coil.
2. The method for manufacturing the coil structure according to clause 1, wherein the bonding includes forming external connection terminals at the plate portions laminated at the first end of the row of terminals, and at the plate portions laminated at the second end of the row of terminals form external connection terminals.
3. The method for manufacturing the coil structure according to clause 1 or 2, wherein the bonding laminates each of the n metal plates, so that the plate portions in the row of terminals of each of the n metal plates, other than the plate portions connected to both ends of the conductor, are electrically isolated from the conductor and function as support portions which support the plate portions of the row of terminals of other metal plates.
4. The method for manufacturing the coil structure according to any one of clauses 1 to 3, further comprising:
forming an insulating film which covers surfaces of each of the n metal plates.
5. The method for manufacturing the coil structure according to any one of clauses 1 to 4, further comprising:
forming an encapsulating resin which covers the coil structure so that a portion of the row of terminals is exposed.

Although the embodiments are numbered with, for example, "first," or "second," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A coil structure comprising:
n metal plates that are laminated, where n is a natural number greater than or equal to two,
wherein each of the n metal plates includes a spiral conductor, and a row of terminals, aligned in a predetermined direction on an outer side of the conductor, and formed by n+1 or more plate portions thicker than the conductor,
wherein two ends of the conductor are connected to two adjacent plate portions for each of the n metal plates,
wherein the row of terminals of a first metal plate is bonded to the row of terminals of a second metal plate which is adjacent to the first metal plate, among the n metal plates that are laminated, and
wherein the two ends of the conductor of a lowermost metal plate among the n metal plates are connected to the two adjacent plate portions located at a first end of the lowermost metal plate, the two ends of the conductor of a second lowest metal plate among the n metal plates are connected to the two adjacent plate portions located at a position shifted one place toward a second end opposite to the first end of the second lowest metal plate, and the position where the two ends of the conductor connect to the two adjacent plate portions shifts one place toward the second end for each upward increase in level within a laminate along a laminated direction of the n metal plates, so that the conductors of each of the n metal plates are connected in series to form a spiral coil.

2. The coil structure as claimed in claim 1, wherein the plate portions laminated at the first end of the row of terminals and the plate portions laminated at the second end of the row of terminals form external connection terminals.

3. The coil structure as claimed in claim 2, wherein the plate portions in the row of terminals of each of the n metal plates, other than the plate portions connected to both ends of the conductor, are electrically isolated from the conductor and function as support portions which support the plate portions of the row of terminals of other metal plates.

4. The coil structure as claimed in claim 2, further comprising:

an insulating film covering surfaces of each of the n metal plates.

5. The coil structure as claimed in claim 2, further comprising:

a plurality of product regions which respectively become an inductor when singulated; and a frame configured to support each of the plurality of product regions from a periphery thereof, wherein the conductor and the row of terminals are formed in each of the plurality of product regions.

6. The coil structure as claimed in claim 3, further comprising:

a plurality of product regions which respectively become an inductor when singulated; and a frame configured to support each of the plurality of product regions from a periphery thereof, wherein the conductor and the row of terminals are formed in each of the plurality of product regions.

7. The coil structure as claimed in claim 1, wherein the plate portions in the row of terminals of each of the n metal plates, other than the plate portions connected to both ends of the conductor, are electrically isolated from the conductor and function as support portions which support the plate portions of the row of terminals of other metal plates.

8. The coil structure as claimed in claim 7, further comprising:

an insulating film covering surfaces of each of the n metal plates.

9. The coil structure as claimed in claim 7, further comprising:

a plurality of product regions which respectively become an inductor when singulated; and a frame configured to support each of the plurality of product regions from a periphery thereof, wherein the conductor and the row of terminals are formed in each of the plurality of product regions.

10. The coil structure as claimed in claim 1, further comprising:

an insulating film covering surfaces of each of the n metal plates.

11. The coil structure as claimed in claim 1, further comprising:

a plurality of product regions which respectively become an inductor when singulated; and a frame configured to support each of the plurality of product regions from a periphery thereof, wherein the conductor and the row of terminals are formed in each of the plurality of product regions.

12. The coil structure as claimed in claim 11, wherein the frame includes a first portion having the same thickness as the conductor, and a second portion having the same thickness as the plate portions forming the row of terminals.

13. An inductor comprising:

the coil structure as claimed in claim 1; and an encapsulating resin covering the coil structure so that a portion of the row of terminals is exposed.

14. The inductor as claimed in claim 13, wherein the encapsulating resin includes a magnetic filler.

* * * * *